US007079592B2

(12) United States Patent
Chang et al.

(10) Patent No.: US 7,079,592 B2
(45) Date of Patent: Jul. 18, 2006

(54) COMPLEMENTARY CODE KEYING DEMODULATION SYSTEM

(75) Inventors: Cheng-Yuan Chang, Taichung (TW); Jie-Hau Huang, Taichung (TW); Hong-Chin Lin, Taipei (TW); Guu-Chang Yang, Taichung (TW); Yung-Hsien Chang, Yunlin (TW); Hsuan-Ching Chao, Keelung (TW)

(73) Assignee: Accton Technology Corporation, Hsinchu (TW)

( * ) Notice: Subject to any disclaimer, the term of this patent is extended or adjusted under 35 U.S.C. 154(b) by 781 days.

(21) Appl. No.: 10/170,451

(22) Filed: Jun. 14, 2002

(65) Prior Publication Data

US 2003/0147478 A1    Aug. 7, 2003

(30) Foreign Application Priority Data

Dec. 31, 2001  (TW) ............................... 90133366 A

(51) Int. Cl.
*H04L 27/22* (2006.01)
*H04L 27/06* (2006.01)
*H04J 11/00* (2006.01)

(52) U.S. Cl. .................... 375/316; 375/340; 370/209
(58) Field of Classification Search ................ 375/343, 375/340, 316, 142, 150, 130, 140, 147; 370/203, 370/209, 208; 708/200, 100, 410, 400, 422
See application file for complete search history.

(56) References Cited

U.S. PATENT DOCUMENTS 5,218,619 A * 6/1993 Dent ........................... 370/209

6,693,951 B1 * 2/2004 Gilhousen et al. .......... 375/130
6,882,692 B1 * 4/2005 Somayazulu ................ 375/343

OTHER PUBLICATIONS

Kakura, "A path restricted sequence estimator using codeword characteristics", The International Symposium on Personal, Indoor and Mobile Radio Communications, 2000. PIMRC 2000, vol. 2, 18-21, Sep. 2000, pp. 1305-1309 vol. 2.*

* cited by examiner

*Primary Examiner*—Tesfaldet Bocure
*Assistant Examiner*—Vineeta S. Panwalkar

(57) ABSTRACT

The present invention relates to both of a bi-stage correlation calculation demodulation system, and a fast walsh block demodulation device at a receiver, wherein the bi-stage correlation calculation demodulation system has a characteristic of bi-stage correlation calculation in which the subsequent second-stage correlation calculations are dependent on the first-stage correlation calculation results by utilizing an incomplete orthogonal property within CCK codewords to arrange the CCK codewords operated in the first-stage correlation calculations and second-stage correlation calculations properly and respectively. The fast walsh block demodulation device comprises: a plurality of adders (operators) constructed to be a first-level correlation calculation circuit and a second-level correlation calculation circuit, and a plurality of process modules constructed to be a third-level correlation calculation circuit, the process modules having the functions of picking one maximum value from four values and performing third-level correlation calculation of conventional basic fast walsh block demodulation device.

8 Claims, 10 Drawing Sheets

COMPLEMENTARY CODE KEYING DEMODULATION SYSTEM

FIELD OF THE INVENTION

The present invention relates to a complementary code keying (CCK) demodulation system, and more particularly relates to a bi-stage correlation calculation demodulation system, and a fast walsh block demodulation device both of which are implemented in a demodulation device in a wireless local area network (WLAN) so as to achieve the goal of decreasing both hardware cost and demodulation time by reducing calculation steps while in demodulating.

BACKGROUND OF THE INVENTION

Recently, with the progress of internet and the popularization of personal computers, the world-wide data can be exchanged so as to make economical and technical progress. However, most of the internet infrastructures are built by the wires made of different materials, such as optical fibers, cables or CAT-5 patch cores, etc., so that it is very inconvenient to build an internet due to many problems and troubles of such as equipment purchase and piping layout. Moreover, the larger the intranet layout is, the more difficult the intranet maintenance is. Thus, by utilizing WLAN, the aforementioned problems can be resolved, and a humanistic and convenient communication environment can then be provided.

The IEEE 802.11 standard established by IEEE is a WLAN standard, wherein a CCK modulation method is mainly utilized for performing data modulation and demodulation processing.

The CCK modulation method utilized by IEEE 802.11b standard is a M-ary orthogonal modulation, wherein one of M different codewords which are nearly completely orthogonal to each other is selected for use in transmission. For example, when the transmitting rate is 11 Mbps, six bits out of eight-bits data waiting for transmission are utilized to select one CCK codeword from sixty-four CCK codewords (M=64), and then the selected CCK codeword is utilized to modulate this six-bit data, and other two bits of the eight-bits data are modulated by differential quadrature phase shifting key (DQPSK), so that each symbol modulated by codeword can carries eight bits data in transmission. The CCK codewords utilized in IEEE 802.11b are derived according to the formula (1), $$C = \exp^{j(\Phi_1+\Phi_2+\Phi_3+\Phi_4)}, \exp^{j(\Phi_1+\Phi_3+\Phi_4)}, \\ \exp^{j(\Phi_1+\Phi_2+\Phi_4)}, -\exp^{j(\Phi_1+\Phi_4)}, \\ \exp^{j(\Phi_1+\Phi_2+\Phi_3)}, \exp^{j(\Phi_1+\Phi_3)}, -\exp^{j(\Phi_1+\Phi_2)}, \exp^{j\Phi_1} \quad (1)$$

wherein C is codeword, and $\exp^{j(\Phi_1+\Phi_2+\Phi_3+\Phi_4)}$, $\exp^{j(\Phi_1+\Phi_3+\Phi_4)}$, $\exp^{j(\Phi_1+\Phi_2+\Phi_4)}$, $-\exp^{j(\Phi_1+\Phi_4)}$, $\exp^{j(\Phi_1+\Phi_2+\Phi_3)}$, $\exp^{j(\Phi_1+\Phi_3)}$, $-\exp^{j(\Phi_1+\Phi_2)}$, and $\exp^{j\Phi_1}$ are eight different chips, respectively. In formula (1), $\Phi_1$, $\Phi_2$, $\Phi_3$ and $\Phi_4$ are dependent on the eight-bits data waiting for transmission. Assume that d0, d1, d2, d3, d4, d5, d6 and d7 stands for each bit of the eight-bits data respectively, wherein $\Phi_1$ is dependent on d0 and d1; $\Phi_2$ is dependent on d2 and d3, $\Phi_3$ is dependent on d4 and d5 and $\Phi_4$ is dependent on d6 and d7. Since there are four possibilities for these phase values $\Phi_1$, $\Phi_2$, $\Phi_3$ and $\Phi_4$, such as 0, $\pi/2$, $\pi$ and $3\pi/2$, $4^4=256$ CCK codewords can be generated.

Since CCK codewords have a walsh structure, the demodulator can be implemented by a simple butterfly structure. Please referring to FIG. 1, FIG. 1 is a diagram showing a conventional basic fast walsh block demodulation device. An input signal 202 of conventional basic fast walsh block demodulation device 200 is soft decision data of eight chips, such as x0, x1, x2, −x3, x4, x5, −x6 and x7 shown in FIG. 1. Sixteen correlative results regarding x0, x1, x2, −x3, x4, x5, −x6 and x7 can be resolved and obtained through the processes of first level 204, second level 206 and third-level 208 in the conventional basic fast walsh block demodulation device 200.

Please referring to FIG. 2, FIG. 2 is a diagram showing a conventional CCK demodulation system utilizing the conventional basic fast walsh block demodulation devices. As shown in FIG. 2, the conventional demodulation system 250 needs to use four conventional fast walsh block demodulation devices 200 for outputting sixty-four correlative results regarding x0, x1, x2, −x3, x4, x5, −x6 and x7, and then to use a pyramid-like arrays (not shown) composed of many comparators to compare the outputs from four conventional basic fast walsh block demodulation devices 200 for obtaining an output result which has the most correlation.

Moreover, as shown in FIG. 1, in the conventional basic fast walsh block demodulation device 200, a circuit structure of the first level 204 needs to use four adders (operators), and a circuit structure of the second level 206 needs eight adders (operators), and a circuit structure of the third-level 208 needs sixteen adders (operators), so that the conventional basic fast walsh block demodulation device 200 is constructed by at least twenty-eight adders totally. Because a conventional CCK demodulation system needs to use four conventional basic fast walsh block demodulation devices 200, therefore at least 112 adders (operators) in total need implementing. Furthermore, in order to pick an output result having the most correlation from the outputs of four conventional basic fast walsh block demodulation devices 200, many comparisons have to be performed on all correlation calculation results, so that at least sixty-three comparators need to be utilized. Therefore, it takes a lot of time to perform the demodulation calculations, thus lowering the working efficiency and meanwhile increasing the cost of hardware fabrication substantially.

On the other hand, referring to table 1, table 1 shows the cross-correlations among the sixty-four CCK codewords. Since those sixty-four CCK codewords utilized in CCK modulation are incompletely orthogonal to each other, such as shown in table 1, the cross-correlations among about 40% CCK codewords are non-zero. This incomplete orthogonal property among CCK codewords lowers the noise and the cross symbol interference resistance of CCK modulation.

TABLE 1

| Correlation | Quantity |
| --- | --- |
| 8 | 1 |
| $4\sqrt{2}$ | 6 |
| 4 | 12 |
| $2\sqrt{2}$ | 8 |
| 0 | 37 |

SUMMARY OF THE INVENTION

In the view of the background of the invention described above, with the progress of wireless communication, products utilizing the CCK modulation of IEEE 802.11b standard becomes more and more popular, wherein the conventional basic fast walsh block demodulation device used in demodulation terminal is the core of CCK demodulation. However, the conventional basic fast walsh block demodulation device needs to take a lot of correlation calculations for demodulation, so that it is very difficult to further accelerate the demodulating speed. Moreover, a large amount of operators are required for constructing the conventional basic fast walsh block demodulation device, so that the cost is increased.

On the other hand, the conventional CCK demodulation system needs to use several conventional basic fast walsh blocks simultaneously to perform a plurality of correlation calculations, thus substantially consuming a lot of power. Therefore, the conventional CCK demodulation system cannot provide better performance and working efficiency for the products currently focusing in design on the features of convenience, endurance and low power consumption.

It is the principal object of the present invention to provide a CCK demodulation system, and more particularly relates to a bi-stage correlation calculation demodulation system. By utilizing the incomplete orthogonal property among sixty-four CCK codewords, the CCK codewords participating in first-stage correlation calculations and those participating in second-stage correlation calculations are arranged and distributed properly to decrease the operation quantities of correlation calculations and obtain the CCK codeword transmitted from transmitter rapidly, so that the complexity of demodulation system in receiver is decreased, and meanwhile, the demodulating speed is enhanced.

It is the other object of the present invention to provide a fast walsh block demodulation device, which is featured in comprising a plurality of process modules having the functions of picking one maximum value from four values and the third-level calculation of the conventional basic fast walsh block demodulation device, wherein the process modules are utilized to replace the third-level operators of the conventional basic fast walsh block demodulation device for reducing the operation quantities, and reducing sixteen outputs of a conventional basic fast walsh block demodulation device to four outputs by utilizing the function of picking one maximum value from four values. Thus, the quantities of the operators and comparators are decreased, and thus not only the cost is reduced, but also the demodulating speed is enhanced.

In accordance with the aforementioned objects of the present invention, the present invention provides a CCK demodulation system, the CCK demodulation system comprising: a first-stage calculation apparatus used to perform first-stage correlation calculations on an input signal, and to output several first-stage calculation results, wherein the CCK codewords utilized in the first-stage correlation calculations have been processed by a first default distribution; a first decision module used to decide and compare the several first-stage calculation results, wherein if the greatest one of the first-stage calculation results is greater than a maximum threshold, and meanwhile at least one of the other first-stage calculation results is less than a minimum threshold, a communicative CCK codeword of the input signal is resolved and obtained by the first decision module in accordance with the greatest first-stage calculation result, and if the greatest first-stage calculation result is less than the minimum threshold, and at least one of the other first-stage calculation results is less than the minimum threshold, then the first decision module outputs at least one activated signal; a second-stage calculation apparatus group consisting of several second-stage calculation apparatuses for receiving the at least one activated signal and activating at least one of several second-stage calculation apparatuses to perform at least one second-stage correlation calculation with the input signal according to the at least one activated signal, thereafter outputting at least one second-stage calculation result, wherein the CCK codewords utilized in the at least one of second-stage calculation have been processed by a second default distribution; and a second decision module used to resolve the communicative CCK codeword of the input signal according to the at least one second-stage calculation result.

The fast walsh block demodulation device of the present invention comprises: several operators used to construct first-level correlation calculation circuits and second-level correlation calculation circuits; and a plurality of process module used to construct third-level correlation calculation circuits, wherein each of the process modules has the features of picking one maximum value from four values and third-level correlation calculation of traditional basic fast walsh block demodulation device. In the fast walsh block demodulation device of the present invention, the third-level correlation calculation results are resolved according to the second-level correlation calculation results so as to achieve the goal of reducing the output quantities of conventional basic fast walsh block demodulation device.

Since the bi-stage correlation calculation demodulation system of the present invention has the feature of bi-stage correlation calculations, by utilizing the incomplete orthogonal property among CCK codewords, the CCK codewords are arranged and divided into several groups appropriately for sequentially performing the first-stage correlation calculations and the second-stage correlation calculations. Therefore, the power consumption of demodulation system is decreased, and the demodulating speed is raised, so that the CCK codeword transmitted from the transmitter is resolved rapidly and efficiently.

Additionally, according to the fast walsh block demodulation device of the present invention, each of the process modules can replace the third-level operator of conventional basic fast walsh block demodulation device, so that the operation quantities of fast walsh block demodulation device and the quantities of comparators are reduced, thereby accelerating the demodulating speed, and decreasing the geometric volume of fast walsh block demodulation device, and meanwhile reducing the power consumption.

Moreover, the fast walsh block demodulation device and the bi-stage correlation calculation demodulation system of the present invention can be implemented together jointly, so that the geometric volume of demodulation system and the power consumption are further decreased, and the demodulating speed is further enhanced.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The CCK demodulation system provided by the present invention is designed in accordance with the incomplete orthogonal property among sixty-four CCK codewords. First, each of sixty-four CCK codewords needs to be assigned to a different number respectively. The value of $\Phi 1$ is set to be 0 at first, and then sixty-four different numbers, such as from No. 1 to No. 64, are given and assigned to ($\Phi 2$, $\Phi 3$, $\Phi 4$), which has sixty-four different values that are from $(0, 0, 0), (0, 0, \pi/2), \ldots, (0, \pi/2, 0), \ldots,$ to $(3\pi/2, 3\pi/2, 3\pi/2)$, in sequence. Hence, the No. 1 CCK codeword represents the CCK codeword whose value is $(0, 0, 0)$, and the No. 2 CCK codeword represents the CCK codeword whose value is $(0, 0, \pi/2)$, and the assigning rule of the other CCK codewords is the same as the aforementioned description.

Figure 1:
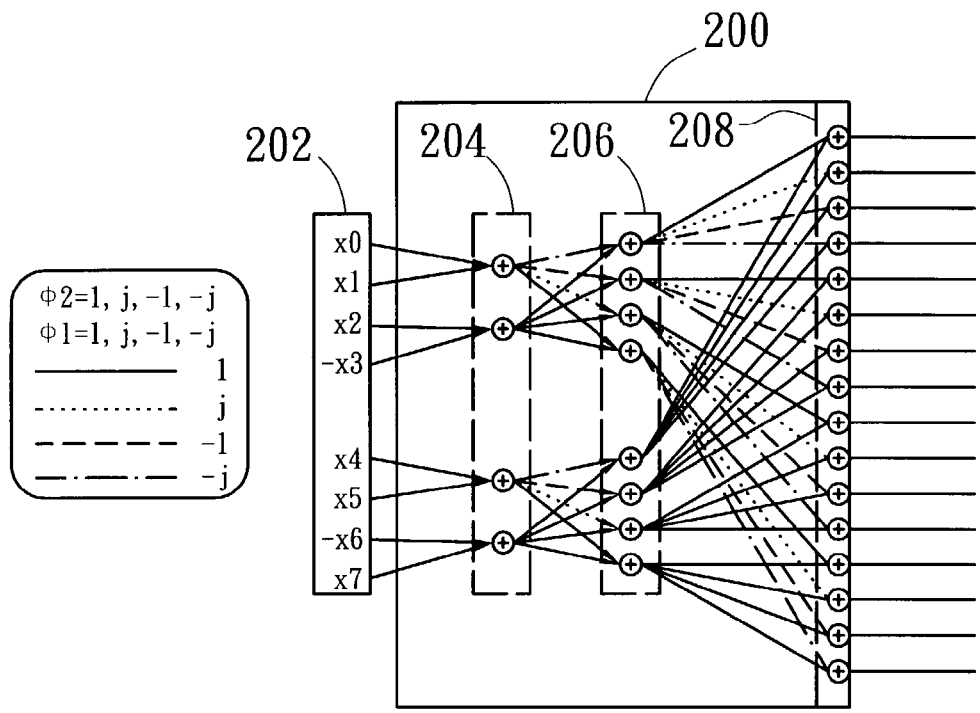
FIG. 1 is a diagram showing a conventional basic fast walsh block demodulation device.
Figure 2:
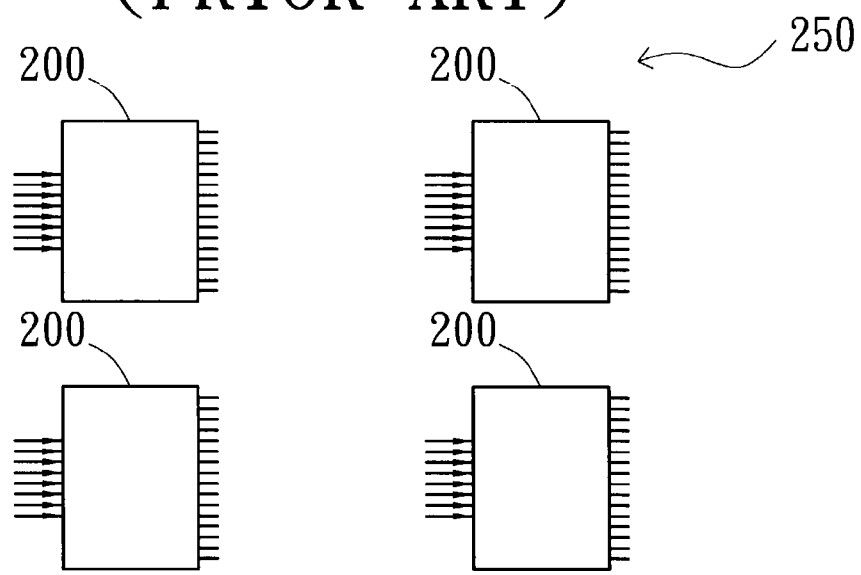
FIG. 2 is a diagram showing a conventional CCK demodulation system utilizing conventional basic fast walsh block demodulation devices.
Figure 3:
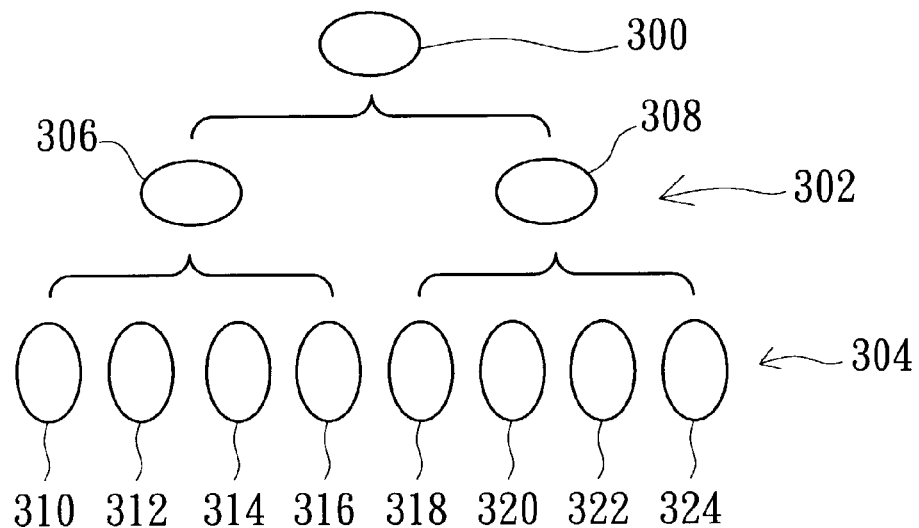
FIG. 3 is a diagram showing a tree structure consisting of sixty-four CCK codewords.

According to the aforementioned assignment to sixty-four CCK codewords, since there is incomplete orthogonal property among the sixty-four CCK codewords, a tree structure can be researched and be utilized to divide the sixty-four CCK codewords into several groups. Please referring to FIG. 3, FIG. 3 is a diagram showing a tree structure consisting of sixty-four CCK codewords. The greatest cross-correlation among the sixty-four CCK codewords within the first level 300 is $4\sqrt{2}$. The greatest cross-correlation among thirty-two CCK codewords within the first group 306 on second level 302 is 4, and the greatest cross-correlation among other thirty-two CCK codewords within the second group 308 on second level 302 is 4. On the third level 304, the greatest cross-correlation among the eight CCK codewords within the first group (g1) 310, the greatest cross-correlation among the eight CCK codewords within the second group (g2) 312, the greatest cross-correlation among the eight CCK codewords within the thirdth group (g3) 314, the greatest cross-correlation among the eight CCK codewords within the fourth group (g4) 316, the greatest cross-correlation among the eight CCK codewords within the fifth group (g5) 318, the greatest cross-correlation among the eight CCK codewords within the sixth group (g6) 320, the greatest cross-correlation among the eight CCK codewords within the seventh group (g7) 322 and the greatest cross-correlation among the eight CCK codewords within the eighth group (g8) 324 are 0 also, that means those eight CCK codewords within eight group are completely orthogonal to each other.

The eight CCK codewords within eight group are disclosed as follows, wherein sixty-four different numbers in brackets indicates sixty-four different CCK codewords according to the aforementioned assigning rule of CCK codewords.

The first group (g1) 310: {1, 3, 9, 11, 33, 35, 41, 43};

The second group(g2) 312: {6, 8, 14, 16, 38, 40, 46, 48};

The third group (g3) 314: {18, 20, 26, 28, 50, 52, 58, 60};

The fourth group (g4) 316: {21, 23, 29, 31, 53, 55, 61, 63};

The fifth group (g5) 318: {2, 4, 10, 12, 34, 36, 42, 44};

The sixth group (g6) 320: {5, 7, 13, 15, 37, 39, 45, 47};

The seventh group (g7) 322: {17, 19, 25, 27, 49, 51, 57, 59}; and

The eighteen group (g8) 324: {22, 24, 30, 32, 54, 56, 62, 64}

From table 1 it is known that if any CCK codeword selected randomly from sixty-four CCK codewords is correlated with other sixty-three CCK codewords, thirty-seven zero values of cross-correlation results are obtained, which means that these thirty-seven CCK codewords are completely orthogonal with this selected CCK codeword. Therefore, if any CCK codeword selected from g1 310 is correlated with other sixty-three CCK codewords, seven CCK codewords except the one selected from g1 310 are completely orthogonal with this selected CCK codeword, and four CCK codewords in g2 312, four CCK codewords in g3 314 and four CCK codewords in g4 316 are completely orthogonal with this selected CCK codeword, respectively, and CCK codewords in g5 318, six CCK codewords in g6 320 and six CCK codewords in g7 322 are completely orthogonal with this selected CCK codeword, respectively, and none of CCK codewords in g8 324 is completely orthogonal with this selected CCK codeword. The correlated statistical data of cross-correlation among CCK codewords are shown as in table 2.

TABLE 2

|    | g1 | g2 | g3 | g4 | g5 | g6 | g7 | g8 |
|----|----|----|----|----|----|----|----|----|
| g1 | 7  | 4  | 4  | 4  | 6  | 6  | 6  | 0  |
| g2 | 4  | 7  | 4  | 4  | 6  | 6  | 0  | 6  |
| g3 | 4  | 4  | 7  | 4  | 6  | 0  | 6  | 6  |
| g4 | 4  | 4  | 4  | 7  | 0  | 6  | 6  | 6  |
| g5 | 6  | 6  | 6  | 0  | 7  | 4  | 4  | 4  |
| g6 | 6  | 6  | 0  | 6  | 4  | 7  | 4  | 4  |
| g7 | 6  | 0  | 6  | 6  | 4  | 4  | 7  | 4  |
| g8 | 0  | 6  | 6  | 6  | 4  | 4  | 4  | 7  |

Since fast walsh transform has an excellent butterfly structure, the complexity of correlation calculations with complex signals can be decreased. However, in four traditional basic fast walsh block demodulation devices, one hundred and twelve adders (or operators) in total have to be operated simultaneously after the beginning of demodulation system constructed by traditional basic fast walsh block demodulation devices, so that a lot of power is consumed. In addition, the incomplete orthogonal property among sixty-four CCK codewords mutually causes worse demodulation performances and lower demodulation efficiency. By utilizing the present invention, the bi-stage correlation calculation demodulation system, the power consumption can be decreased during demodulation, and meanwhile the accuracies of demodulation results are enhanced.

Figure 4:
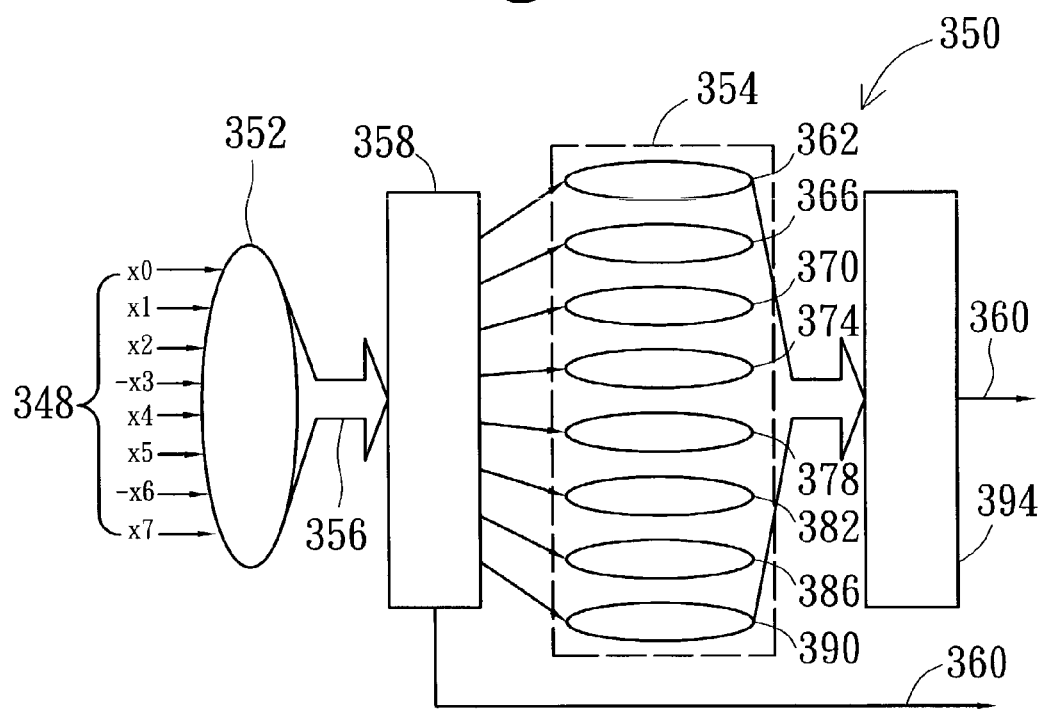
FIG. 4 is a diagram showing an embodiment of a bi-stage correlation calculation demodulation system provided by the present invention.

Please referring to FIG. 4, FIG. 4 is a diagram showing an embodiment of a bi-stage correlation calculation demodulation system provided by the present invention. In the 32—32 bi-stage correlation calculation demodulation system 350 shown in FIG. 4, the first-stage calculation apparatus is designed to pick four CCK codewords, such as the first CCK codeword, the second CCK codeword, the third CCK codeword and the fourth CCK codeword, from g1 310, g2 312, g3 314, g4 316, g5 318, g6 320, g7 322 and g8 324, respectively, to perform a plurality of first-stage correlation calculations with the inputted complex signal 348. In other words, the assigned numbers of thirty-two CCK codewords in eight groups are: (No. 1, No. 3, No. 9, No. 11), (No. 6, No. 8, No. 14, No. 16), (No. 18, No. 20, No. 26, No. 28), (No. 21, No. 23, No. 29, No. 31), (No. 2, No. 4, No. 10, No. 12), (No. 5, No. 7, No. 13, No. 15), (No. 17, No. 19, No. 25, No. 27), and (No. 22, No. 24, No. 30, No. 32), respectively. These thirty-two CCK codewords are distributed onto the first-stage calculation apparatus 352 for performing a plurality of first-stage correlation calculations, and other thirty-two CCK codewords are distributed onto a second-stage calculation apparatus group 354 to perform at least one second-stage correlation calculation. Moreover, the calculation apparatus in the second-stage calculation apparatus group 354 is activated in accordance with the results of first-stage correlation calculations.

After the complex signal processed by the first-stage calculation apparatus 352, thirty-two first-stage calculation results are obtained. The first decision module 358 decides and obtains the greatest first-stage calculation result among thirty-two first-stage calculation results, and then decides if this greatest first-stage calculation result is greater than a maximum threshold. If this greatest first-stage calculation result is greater than the maximum threshold, and meanwhile, other first-stage calculation results, which belongs to the group consisting of the greatest first-stage calculation result, are less than a minimum threshold, the CCK codeword transmitted from transmitter is decided to be the CCK codeword in the first-stage calculation apparatus, wherein the greatest first-stage calculation result is obtained by correlating with the CCK codeword and the complex signal 348, and the maximum threshold and the minimum threshold are designed in accordance with the circuit design, e.g., the maximum threshold is predetermined to be a complex value that is almost equal to eight but less than eight, and the minimum threshold is predetermined to be a complex value that is almost equal to zero but greater than zero since the ideal correlation calculation results among CCK codewords should be zero.

Otherwise, if this greatest first-stage calculation result is not greater than the maximum threshold, the first-stage calculation apparatus 352 will use the plurality of first-stage calculation results that are among the thirty-two first-stage calculation results and less than the minimum threshold as the output 356. Meanwhile, a plurality of activated signals are outputted to activate the corresponding calculation apparatus of second-stage calculation apparatus group 354. In the demodulation system 350 shown in FIG. 4, the second-stage calculation apparatus group 354 consists of eight second-stage correlation calculation circuits, which are first second-stage calculation apparatus 362, second second-stage calculation apparatus 366, third second-stage calculation apparatus 370, fourth second-stage calculation apparatus 374, fifth second-stage calculation apparatus 378, sixth second-stage calculation apparatus 382, seventh second-stage calculation apparatus 386, and eighth second-stage calculation apparatus 390.

For example, if the CCK codeword transmitted from transmitter is the No. 1 CCK codeword, a plurality of first-stage correlation calculations are performed by in the first-stage calculation apparatus 352 onto the complex signal 348 and thirty-two CCK codewords in eight groups, and thereby obtaining thirty-two first-stage calculation results. These thirty-two first-stage calculation results are used as the output 356 of the first-stage calculation apparatus 352 and sent to the first decision module 358 for judgment.

According to the aforementioned grouping of CCK codewords and the statistic data of table 1 and table 2, the No. 1 CCK codeword belongs to g1 310, so that the greatest first-stage calculation result among several first-stage calculation results is decided to be greater than the maximum by the first decision module 358, wherein the greatest first-stage calculation result is obtained by correlating the complex signal 348 and the No. 1 CCK codeword in the first-stage calculation apparatus 352. Meanwhile, the first-stage calculation result of complex signal 348 and the No. 3 CCK codeword, the first-stage calculation result of complex signal 348 and the No. 9 CCK codeword, and the first-stage calculation result of complex signal 348 and the No. 11 CCK codeword are less than the minimum threshold, (since the No. 1 CCK codeword, the No. 3 CCK codeword, No. 9 CCK codeword and the No. 11 CCK codeword belong to g1 310), so that the corresponding CCK codeword is resolved by the first decision module 358 according to the greatest first-stage calculation result, and the corresponding CCK codeword is the output 360 of 32—32 bi-stage calculation demodulation system 350 of the present invention, and the subsequent second-stage calculation apparatus group 354 does not need to be activated.

In another example, if the CCK codeword transmitted from transmitter is the No. 33 CCK codeword, a plurality of first-stage correlation calculations are performed with the complex signal 348 and thirty-two CCK codewords in eight groups in the first-stage calculation apparatus 352, and thirty-two first-stage calculation results are obtained. These thirty-two first-stage calculation results are used as the output 356 of the first-stage calculation apparatus 352 and sent to the first decision module 358 for judgment.

According to the aforementioned grouping of CCK codewords and the statistic data of table 1 and table 2, the No. 33 CCK codeword belongs to g1 310, but the No. 33 CCK codeword is not distributed to the first-stage calculation apparatus 352. Therefore, the greatest first-stage calculation result among thirty-two first-stage calculation results is not greater than the maximum threshold, so that the thirty-two first-stage calculation results have to be screened by the first decision module 358. Since the No. 1 CCK codeword, the No. 3 CCK codeword, No. 9 CCK codeword, the No. 11 CCK codeword and the No. 33 CCK codeword belong to g1 310, so four first-stage calculation results, which are obtained by correlating the No. 1 CCK codeword, the No. 3 CCK codeword, No. 9 CCK codeword, the No. 11 CCK codeword and the complex signal 348 respectively, are less than the minimum threshold. Then, an activated signal is outputted from the first decision module 358 to activate the corresponding first second-stage calculation apparatus 362 in second-stage calculation apparatus group 354 to perform correlation calculations with the complex signal 348, and then first second-stage calculation result is obtained and is inputted to a second decision module 394.

In addition, in the thirty-two first-stage calculation results, there may be other first-stage calculation results, which are obtained by correlating the complex signal 348 and other CCK codewords and are less than the minimum threshold. The activated signal is also outputted from the first decision module 358 to activate the corresponding calculation apparatuses in the second-stage calculation apparatus group 354.

For example, if the first-stage calculation results, which are obtained by correlating with four CCK codewords, such as the No. 5 CCK codeword, the No. 7 CCK codeword, the No. 13 CCK codeword and the No. 15 CCK codeword in g6 320, and the CCK codeword transmitted from transmitter, are less than the minimum threshold, the corresponding sixth second-stage calculation apparatus 382 is also activated by the first decision module 358, so that the correlation calculations are performed with the complex signal 348 and other four CCK codewords in g6 320, besides the No. 5 CCK codeword, the No. 7 CCK codeword, the No. 13 CCK codeword and the No. 15 CCK codeword, wherein the other four CCK codewords are the No. 37 CCK codeword, the No. 39 CCK codeword, the No. 45 CCK codeword and the No. 47 CCK codeword, respectively. Then, the sixth second-stage calculation result is outputted to the second decision module 394, and other theorems about the activation of first-stage calculation apparatus 352 and second-stage calculation apparatus group 354 are the same as the aforementioned descriptions. Finally, according to the inputted second-stage calculation result, the maximum one among the inputted second-stage calculation result is decided and obtained in the second decision module 394, and the CCK code corresponding to the maximum one is regarded as the output 360 of the demodulation system 350.

Figure 5:
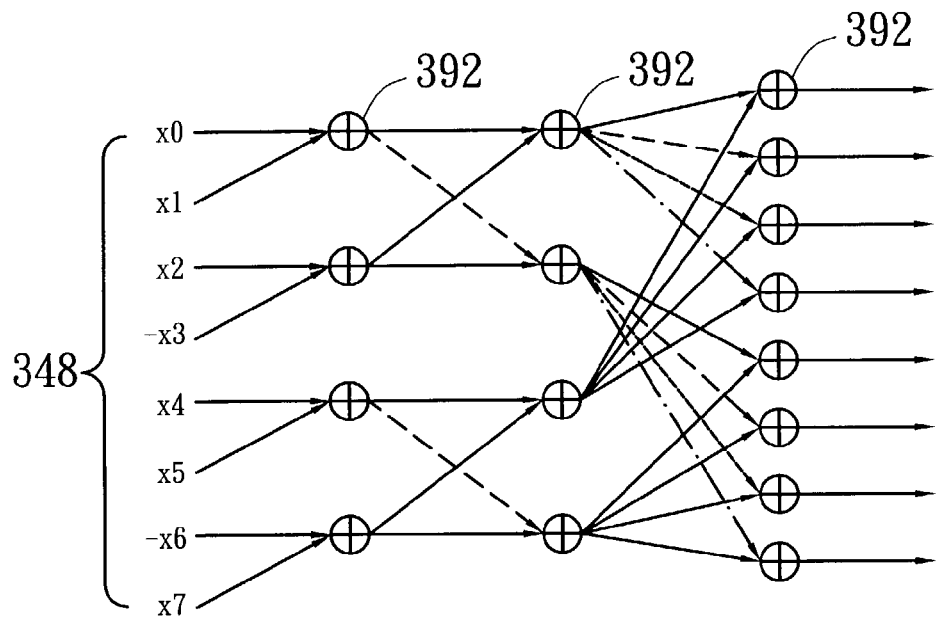
FIG. 5 is a diagram showing one of four circuit structures in the first-stage calculation apparatus according to the demodulation system shown in FIG. 4.

In order to reduce the complexity of structure of demodulation system, the demodulation system 350 shown in FIG. 4 is implemented in a butterfly structure. Please referring to FIG. 5, FIG. 5 is a diagram showing one of four circuit structures in the first-stage calculation apparatus according to the demodulation system shown in FIG. 4, wherein sixteen adders 392 are required, so that the first-stage calculation apparatus 352 is constructed by sixty-four adders 392, and the dotted arrow indicated the transmitted complex value that needs to be rotated with appropriate degrees, and the solid arrow indicates the transmitted complex value that is not rotated. Then, please referring to FIG. 6, FIG. 6 is a diagram showing one of eight circuit structure groups in the second-stage calculation apparatus group according to the demodulation system shown in FIG. 4, wherein twelve adders 392 are required, and the dotted arrow indicated the transmitted complex value that needs to be rotated with appropriate degrees, and the solid arrow indicates the transmitted complex value that is not rotated.

Figure 6:
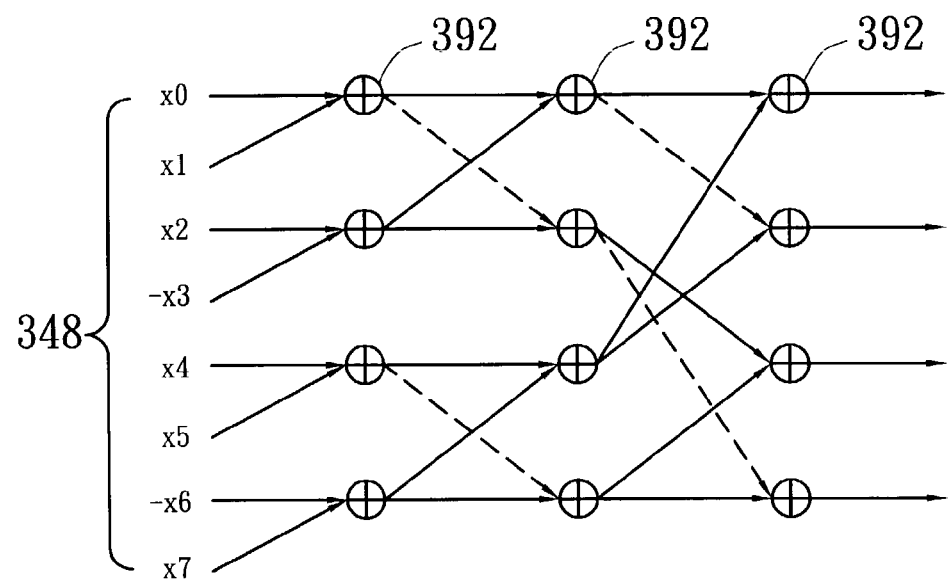
FIG. 6 is a diagram showing one of eight circuit structure groups in the second-stage calculation apparatus group according to the demodulation system shown in FIG. 4.

According to the circuit structures shown in FIG. 5 and FIG. 6, there is known that the demodulation system 350 needs one hundred and sixty adders (operators) 392, wherein the first-stage calculation apparatus needs sixty-four adders 392, and the second-stage calculation apparatus group 354 needs ninety-six adders 392 because the second-stage calculation apparatus group 354 has eight calculation circuits. The operation quantity of demodulation system 350 shown in FIG. 4 is eighty-eight, and the operation quantity of first-stage calculation apparatus 352 is sixty-four, and the operation quantity of second-stage calculation apparatus group 354 is twenty-four.

During the analysis of operation of demodulation system 350, it is known that four second-stage calculation apparatuses are activated and operated at the same time while the second-stage calculation apparatus group 354 is activated and operated. Moreover, each of No. 1 to No. 16 CCK codewords is completely orthogonal with each of No. 33 to No. 48 CCK codewords, and each of No. 17 to No. 32 CCK codewords are completely orthogonal with each of No. 49 to No. 64 CCK codewords. Accordingly, any CCK codeword selected from No. 1 to No. 16 CCK codewords is completely orthogonal with each of No. 33 to No. 48 CCK codewords, respectively, and any CCK codeword selected from No. 17 to No. 32 CCK codewords is completely orthogonal with each of No. 49 to No. 64 CCK codewords, respectively. Therefore, the demodulation system 350 shown in FIG. 4 can be improved according to the orthogonal property among sixty-four CCK codewords.

Figure 7:
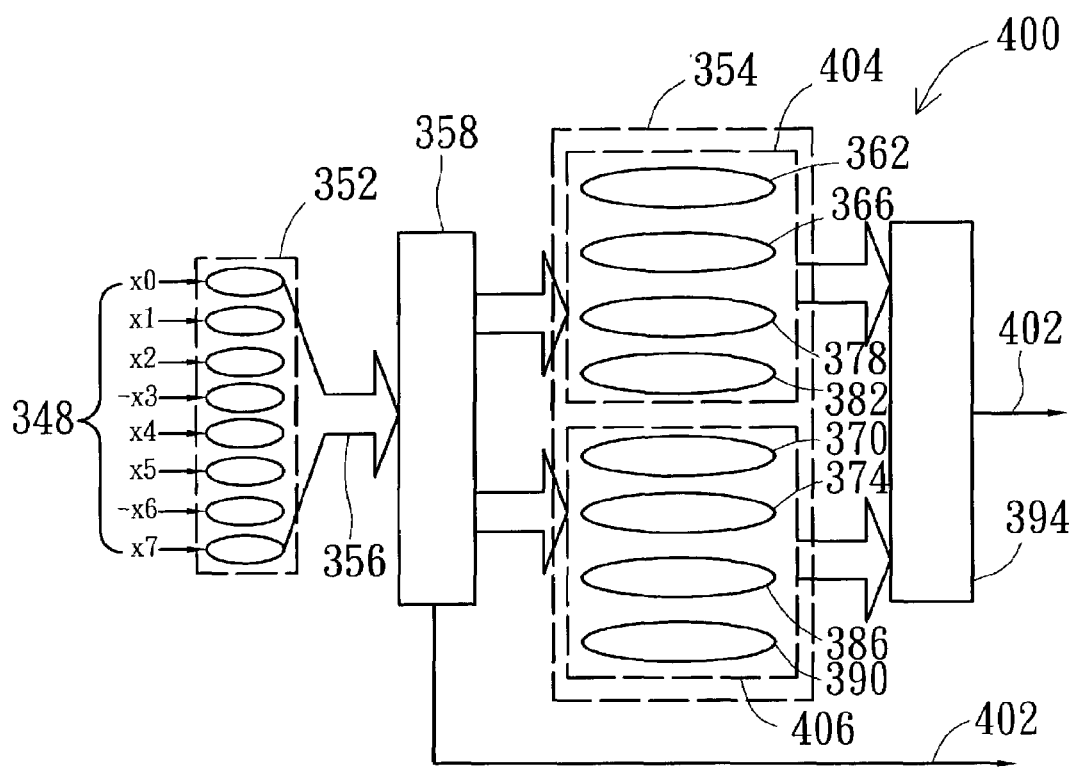
FIG. 7 is a diagram showing a preferred embodiment of a bi-stage correlation calculation demodulation system provided by the present invention.

Please referring to FIG. 7, FIG. 7 is a diagram showing a preferred embodiment of a bi-stage correlation calculation demodulation system provided by the present invention. In FIG. 7, the modified 32—32 bi-stage correlation calculation demodulation system 400 of the present invention is shown, and the operation theorem and flow path of the first-stage calculation apparatus 352 thereof is the same as those of the first-stage calculation apparatus 352 in the embodiment shown in FIG. 4. However, in the second-stage calculation apparatus group 354, eight second-stage calculation apparatuses are distributed to a first sub-apparatus group 404 and a second sub-apparatus group 406, wherein the first sub-apparatus group 404 consists of the first second-stage calculation apparatus 362, the second second-stage calculation apparatus 366, the fifth second-stage calculation apparatus 378 and the sixth second-stage calculation apparatus 382, and the second sub-apparatus group 406 consists of the third second-stage calculation apparatus 370, the fourth second-stage calculation apparatus 374, the seventh second-stage calculation apparatus 386 and the eighth second-stage calculation apparatus 390. Since the first decision module 358 uses thirty-two first-stage calculation results to determine if the first sub-apparatus group 404 or the second sub-apparatus group 406 should be activated, so that the operation quantity of demodulation system can be reduced, and the related operation theorem is described as follows.

In the first-stage calculation apparatus 352, if a first-stage calculation result obtained by correlating the complex signal 348 and a CCK codeword of eight groups, such as (No. 1, No. 3, No. 9, No. 11), (No. 6, No. 8, No. 14, No. 16), (No.

18, No. 20, No. 26, No. 28), (No. 21, No. 23, No. 29, No. 31), (No. 2, No. 4, No. 10, No. 12), (No. 5, No. 7, No. 13, No. 15), (No. 17, No. 19, No. 25, No. 27), (No. 22, No. 24, No. 30, No. 32), is the greatest first-stage calculation result among several first-stage calculation results and is greater than the maximum threshold, and meanwhile, other three first-stage calculation results, which are obtained by correlating the complex signal 348 and other three CCK codewords of the group to which the aforementioned CCK codeword belongs, are less than the minimum threshold, the CCK codeword transmitted from transmitter can be resolved by the first decision module 358 and regarded as the output 402 of demodulation system 400, wherein the operation theorem is the same as that of embodiment shown in FIG. 4.

When the first-stage calculation result obtained by correlating the complex signal 348 and any CCK codeword of eight groups is not greater than the maximum threshold, the judgment condition used by first decision module 358 is if four first-stage calculation results are all less than the minimum threshold, so as to activate the corresponding sub-apparatus group of second-stage calculation apparatus group 354, wherein four CCK codewords belonging to one of the eight groups are used to generate those four first-stage calculation results.

For example, the No. 35 CCK codeword is the CCK codeword transmitted from transmitter. First, the first-stage calculation apparatus 352 performs a plurality of first-stage correlation calculations onto the complex signal 348 and thirty-two CCK codewords of eight groups respectively, thereby obtaining thirty-two first-stage calculation results. Then, these thirty-two first-stage calculation results are regarded as the output 356 of the first-stage calculation apparatus 352 and are send to the first decision module 358 for judgment.

According to the aforementioned grouping of CCK codewords and the statistic data of table 1 and table 2, the No. 35 CCK codeword belongs to g1 310, but the No. 35 CCK codeword is not distributed to the first-stage calculation apparatus 352. Therefore, the greatest first-stage calculation result among thirty-two first-stage calculation results is not greater than the maximum threshold, so that the thirty-two first-stage calculation results have to be screened by the first decision module 358. Since the No. 1 CCK codeword, the No. 3 CCK codeword, No. 9 CCK codeword, the No. 11 CCK codeword and the No. 35 CCK codeword belong to g1 310, so that four first-stage calculation results, which are obtained by correlating the No. 1 CCK codeword, the No. 3 CCK codeword, No. 9 CCK codeword, the No. 11 CCK codeword and the complex signal 348 respectively, are less than the minimum threshold. Furthermore, there may be other first-stage calculation results, which are obtained by correlating the complex signal 348 and CCK codewords in the same group respectively, and are less than the minimum threshold, so that the activated signal is also outputted for activating the corresponding second-stage calculation apparatus.

According to the orthogonal property of sixty-four CCK codewords: "any CCK codeword selected from No. 1 to No. 16 CCK codewords is completely orthogonal with each CCK codeword from No. 33 to No. 48 CCK codewords", the activated signal is outputted from the first decision module 358 to activate the first sub-apparatus group 404, and the second sub-apparatus group 406 is not activated so as to decrease the power consumption. Finally, the CCK codeword transmitted from transmitter is resolved after the process of first sub-apparatus group 404, and is regarded as the output 402 of bi-stage correlation calculation demodulation system 400.

In another example, the No. 53 CCK codeword is the CCK codeword transmitted from transmitter. The operation theorem of first-stage calculation apparatus 352 is the same as the description above. According to the orthogonal property of sixty-four CCK codewords: "any CCK codeword selected from No. 17 to No. 32 CCK codewords is completely orthogonal with each CCK codeword from No. 49 to No. 64 CCK codewords", the activated signal is outputted from the first decision module 358 to activate the second sub-apparatus group 406 and the first sub-apparatus group 404 is not activated. Finally, the CCK codeword transmitted from transmitter is resolved after the process of second sub-apparatus group 406 is performed, and is regarded as the output 402 of bi-stage correlation calculation demodulation system 400.

Figure 8:
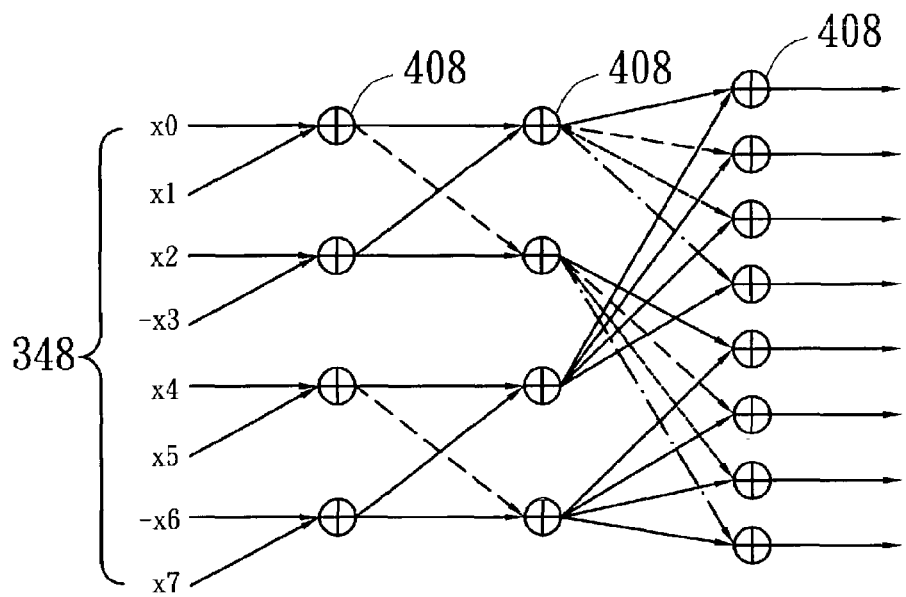
FIG. 8 is a diagram showing one of four circuit structures in the first-stage calculation apparatus or in the second-stage calculation apparatus group according to the demodulation system shown in FIG. 7.

On the other hand, the circuit structures of the first-stage calculation apparatus 352 and that of the second-stage calculation apparatus group 354, such as shown in FIG. 7, all can be constructed by four circuit structures shown in FIG. 8. FIG. 8 is a diagram showing one of the four circuit structures in the first-stage calculation apparatus or in the second-stage calculation apparatus group according to the demodulation system shown in FIG. 7, wherein sixteen adders 408 are required, so that the first-stage calculation apparatus 352 is constructed by sixty-four adders 408 in total, and second-stage calculation apparatus group 354 is also constructed by sixty-four adders 408 in total, and the dotted arrow indicated the transmitted complex value that needs to be rotated with appropriate degrees, and the solid arrow indicates the transmitted complex value that is not rotated.

After the statistical analysis, it is known that the demodulation system 400 shown in FIG. 7 needs one hundred and twenty-eight adders 408 totally, wherein the first-stage calculation apparatus 352 needs sixty-four adders 408, and the second-stage calculation apparatus group 354 having eight group circuits needs sixty-four adders 408. The operation quantity of demodulation system 400 shown in FIG. 7 is eighty, and the operation quantity of first-stage calculation apparatus 352 is sixty-four, and the operation quantity of second-stage calculation apparatus group 354 is sixteen.

Furthermore, the circuit structure of second-stage calculation apparatus group 354 can reuse the circuit structure of first-stage calculation apparatus 352 directly by utilizing a Φ2 assigned circuit (not shown) additionally, so that more operators are reduced in hardware implementation. After the statistical analysis, while the Φ2 assigned circuit is utilized, it is known that the demodulation system 400 shown in FIG. 7 only requires sixty-four adders (operators), because the same circuit is utilized by the first-stage calculation apparatus 352 and the second-stage calculation apparatus group 354, and the operation quantity of demodulation system 400 shown in FIG. 7 is still eighty.

Figure 9:
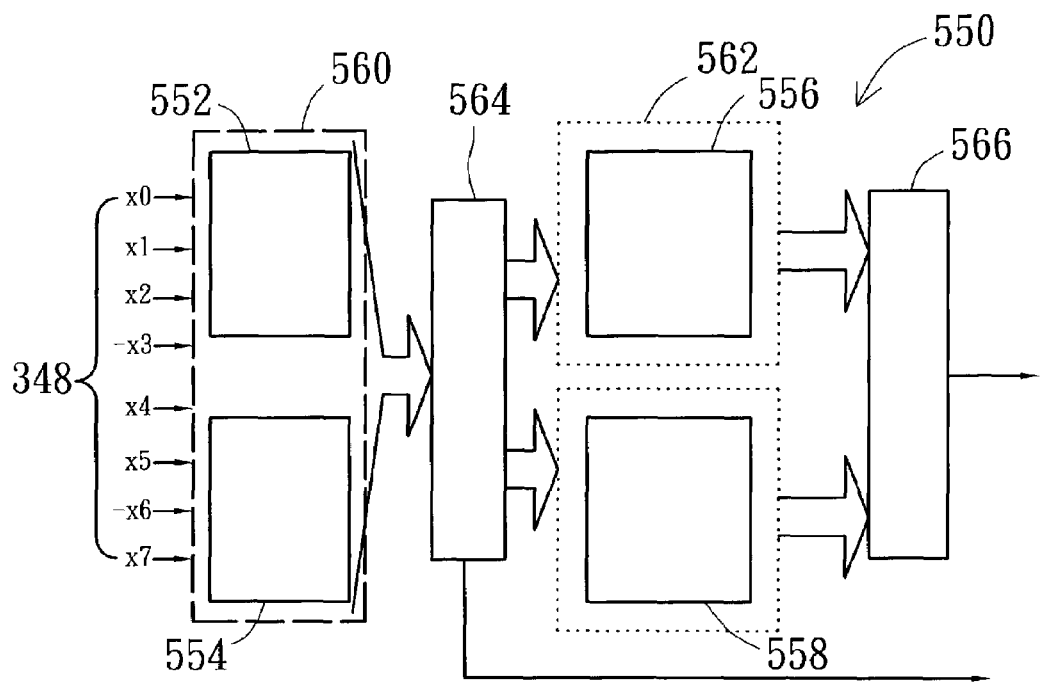
FIG. 9 is a diagram showing another preferred embodiment of a bi-stage correlation calculation demodulation system provided by the present invention.

Please referring to FIG. 9, FIG. 9 is a diagram showing another preferred embodiment of a bi-stage correlation calculation demodulation system provided by the present invention. FIG. 9 shows an improved walsh transform demodulation system 550 of the present invention, wherein the first-stage calculation apparatus 560 is constructed by two traditional fast walsh block demodulation devices (a first fast walsh block demodulation device 552 and a second fast walsh block demodulation device 554), and the second-stage calculation apparatus 562 is also constructed by two traditional fast walsh block demodulation devices (a third fast walsh block demodulation device 556 and a fourth fast walsh block demodulation device 558). The operation theorem of demodulation system 550 shown in FIG. 9 is described as follows.

First, thirty-two CCK codewords, such as from No. 1 to No. 32 CCK codewords, are selected from sixty-four CCK codewords in the first-stage calculation apparatus 560, and a plurality of correlation calculations are performed with the complex signal 348 and the selected thirty-two CCK codewords respectively by utilizing the first fast walsh block demodulation device 552 and the second fast walsh block demodulation device 554. Then, the third fast walsh block demodulation device 556 or the fourth fast walsh block demodulation device 558 is activated by the first decision module 564 in accordance with the first-stage calculation results for performing the second-stage correlation calculations.

In the first-stage calculation apparatus 560, if a first-stage calculation result, which is the greatest value among sixteen first-stage calculation outputted from one of first fast walsh block demodulation device 552 and the second fast walsh block demodulation device 554, is greater than the maximum threshold, and another first-stage calculation result, which is the greatest value among sixteen first-stage calculation outputted from another one of first fast walsh block demodulation device 552 and the second fast walsh block demodulation device 554, is between the maximum threshold and the minimum threshold, the CCK codeword transmitted from transmitter can be resolved and decided to be the CCK codeword, to which the greatest first-stage calculation result among thirty-two first-stage calculation results corresponds, by the first decision module 564.

Otherwise, according to the greatest first-stage calculation result that is less than the minimum threshold, the fast walsh block demodulation device, which is the corresponding CCK codeword located in, is decided and obtained by the first decision module 564. Then, according to the orthogonal property of CCK codewords: "any CCK codeword selected from No. 1 to No. 16 CCK codewords is completely orthogonal with each CCK codeword from No. 33 to No. 48 CCK codewords, and any CCK codeword selected from the No. 17 to No. 32 CCK codewords is completely orthogonal with each CCK codeword from No. 49 to No. 64 CCK codewords", the corresponding fast walsh block demodulation device of second-stage calculation apparatus 562 is activated.

For example, the first fast walsh block demodulation device 552 is assigned to perform the correlation calculations of No. 1 to No. 16 CCK codewords, and the second fast walsh block demodulation device 554 is assigned to perform the correlation calculations of No. 17 to No. 32 CCK codewords, and the third fast walsh block demodulation device 556 is assigned to perform the correlation calculations of No. 33 to No. 48 CCK codewords, and the fourth fast walsh block demodulation device 558 is assigned to perform the correlation calculations of No. 49 to No. 64 CCK codewords.

If the first-stage calculation result, which is obtained by correlating the No. 16 CCK codeword with the complex signal 348, is the greatest first-stage calculation result among several first-stage calculation outputs from the first fast walsh block demodulation device 552 and is less than the minimum threshold, the corresponding third fast walsh block demodulation device 556 of second-stage calculation apparatus 562 is activated for performing a plurality of second-stage correlation calculations to the complex signal 348. Then, the CCK codeword transmitted from transmitter is resolved after the outputted second-stage calculation results are decided by the second decision module 566.

Similarly, If the first-stage calculation result, which is obtained by correlating the No. 32 CCK codeword with the complex signal 348, is the greatest first-stage calculation result among several first-stage calculation outputs from the second fast walsh block demodulation device 554 and is less than the minimum threshold, the corresponding fourth fast walsh block demodulation device 558 of second-stage calculation apparatus 562 is activated for performing a plurality of second-stage correlation calculations onto the complex signal 348. Then, the CCK codeword transmitted from transmitter is resolved after the outputted second-stage calculation results are decided by the second decision module 566.

After the statistical analysis, it is known that the demodulation system 550 shown in FIG. 9 needs one hundred and twelve adders totally and the operation quantity of demodulation system 550 shown in FIG. 9 is seventy, wherein two traditional fast walsh block demodulation devices are required in the first-stage calculation apparatus 560 and the second-stage calculation apparatus 562, respectively, and each traditional fast walsh block demodulation device is constructed by twenty-eight adders, and the operation quantity of first-stage calculation apparatus 560 is fifty-six, and the operation quantity of second-stage calculation apparatus 562 is fourteen.

Furthermore, the circuit structure of second-stage calculation apparatus 562 can reuse the circuit structure of first-stage calculation apparatus 560 directly by utilizing a Φ2 assigned circuit (not shown) additionally, so that more operators are reduced in hardware implementation. After the statistical analysis, while the Φ2 assigned circuit is utilized, it is known that the demodulation system 550 shown in FIG. 9 only requires fifty-six adders (operators) because the same circuit is utilized by the first-stage calculation apparatus 560 and the second-stage calculation apparatus 562, and the operation quantity of demodulation system 550 shown in FIG. 9 is still seventy.

On the other hand, since the traditional basic fast walsh block demodulation device is constructed by many adders for performing a lot of correlation calculations, so that each traditional basic fast walsh block demodulation device consumes a lot of power. Thus, the present invention provides a fast walsh block demodulation device for settling the issue mentioned above.

Figure 10:
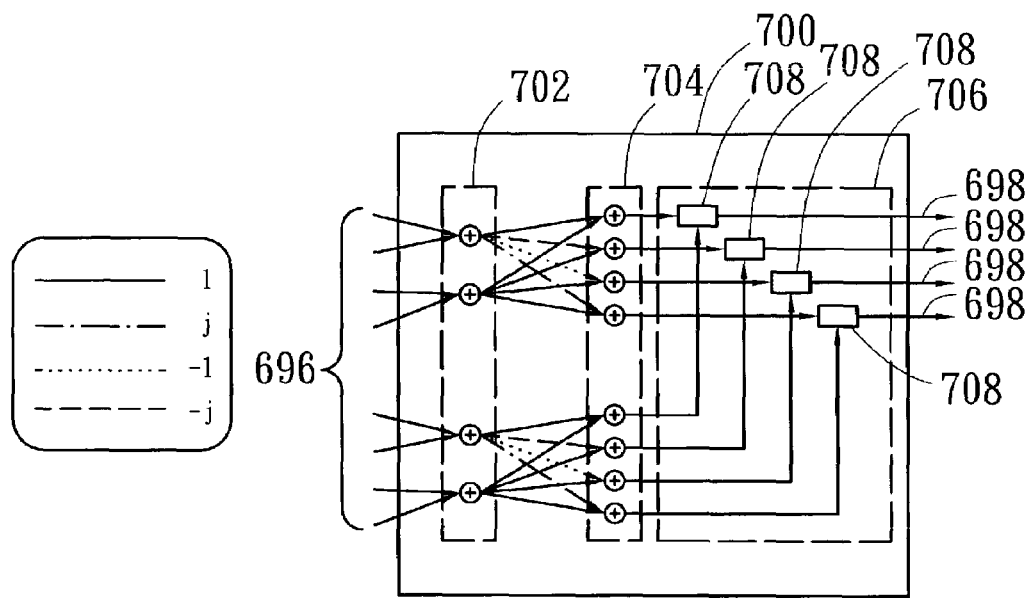
FIG. 10 is a diagram showing an embodiment of fast walsh block demodulation device provided by the present invention.

Please referring to FIG. 10, FIG. 10 is a diagram showing an embodiment of fast walsh block demodulation device provided by the present invention. After an input signal 696 enters the fast walsh block demodulation device 700 of the present invention, four correlation calculation results are resolved through the calculations of first-level 702, second-level 704 and third-level 706, respectively. According to the present invention, the circuit structures and the calculations of the first-level 702 and second-level 704 of fast walsh block demodulation device 700 are the same as those of the conventional basic fast walsh block demodulation device, but the circuit structures and the calculations of the third-level 706 of fast walsh block demodulation device 700 are not the same as those of the conventional basic fast walsh block demodulation device.

In the calculations of third-level 208 of the conventional basic fast walsh block demodulation device 200, each output of four adders of eight adders in second-level 206 is rotated by four appropriate angles, such as 0 degree, 90 degrees, 180 degrees and 270 degrees, for generating total sixteen different complex signals that are regarded as one input of each sixteen adders in third-level 208, respectively. Meanwhile, each output of another four adders of eight adders in second-level 206 is duplicated to four same complex signals that are regarded as another input of four adders of sixteen adders in third-level 208, respectively. Therefore, sixteen outputs from conventional basic fast walsh block demodulation device 200 are obtained.

Hence, within the sixteen outputs in the third-level 208 of the conventional basic fast walsh block demodulation device 200, there is one maximum value among each four outputs in sequence, so that only one calculation for obtaining the maximum value has to be performed, and another three calculations can be omitted. Therefore, the maximum value still can be obtained from each four outputs in sequence with omitting those three calculations. The theorem of how to pick and obtain the maximum from four outputs in sequence and the correlative circuits are described as follows.

Figure 11:
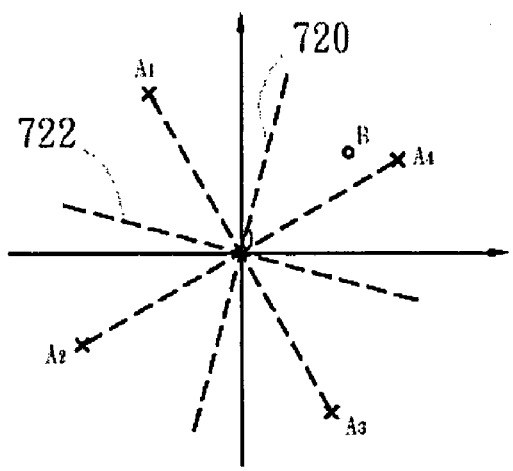
FIG. 11 is a diagram showing coordinate positions between the fixed complex signal and unfixed complex signal during the third-level correlation calculations of conventional basic fast walsh block demodulation device.

Please referring to FIG. 11, FIG. 11 is a diagram showing coordinate positions between the fixed complex signal and unfixed complex signal during the third-level correlation calculations of conventional basic fast walsh block demodulation device, wherein the unfixed complex signal is a complex signal waiting for rotating four different angles respectively, and B point indicates the position of fixed signal, and $A_1, A_2, A_3$ and $A_4$ indicate the position of unfixed complex signal rotated 0 degree, the position of unfixed complex signal rotated 90 degrees, the position of unfixed complex signal rotated 180 degrees and the position of unfixed complex signal rotated 270 degrees respectively, and a dotted line 720 is a bisector of $\angle A_2OA_3$ and $\angle A_1OA_4$, and a dotted line 722 is a bisector of $\angle A_1OA_2$ and $\angle A_3OA_4$. By the separation with the dotted line 720 and the dotted line 722, four regions are generated. Such as shown in FIG. 11, the fixed complex signal B and the complex signal $A_4$ belong to a same region, so that $\angle BOA_4$ is the smallest (comparing with $\angle BOA_1, \angle BOA_2$ and $\angle BOA_3$). Thus, it is known that a maximum value is generated while the fixed complex signal B adds the unfixed complex signal A that has been rotated 270 degrees (comparing with the value generated while the fixed complex signal B adds the unfixed complex signal A that has been rotated 0 degree, the value generated while the fixed complex signal B adds the unfixed complex signal A that has been rotated 90 degrees and the value generated while the fixed complex signal B adds the unfixed complex signal A that has been rotated 180 degrees). Therefore, the calculation that is the addition of fixed complex signal B and the unfixed complex signal A that has been rotated 270 degrees is just only required to perform.

Figure 12:
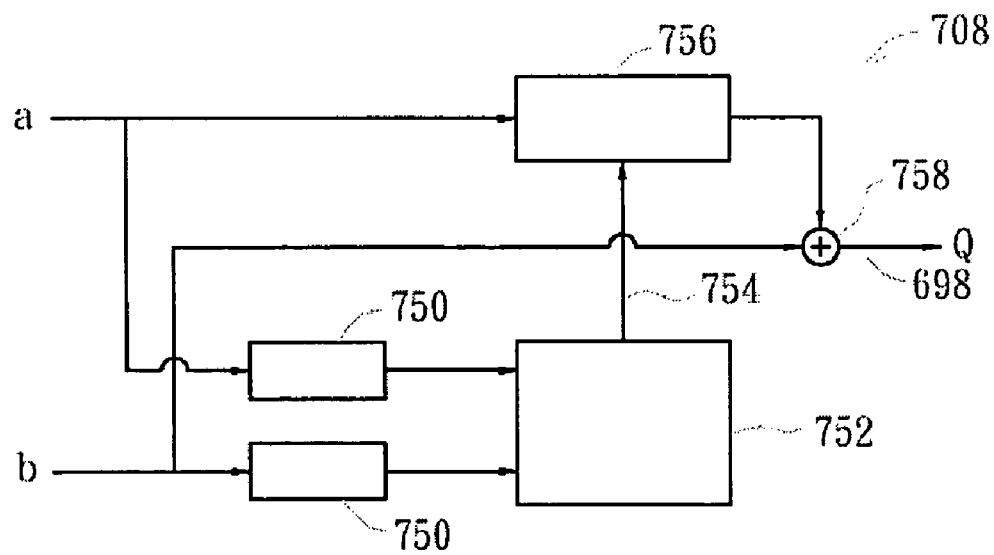
FIG. 12 is a diagram showing an embodiment of process module that performs a third-level calculation in the fast walsh block demodulation device provided by the present invention.
Figure 13:
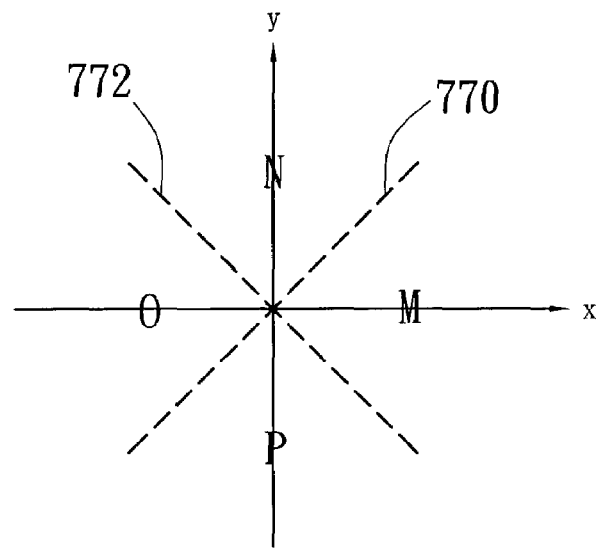
FIG. 13 is a diagram showing an embodiment of coordinate location while the process module shown in FIG. 12 is implemented.

For knowing how much degrees the unfixed complex signal has to be rotated to be located at the same region with the fixed complex signal B, please refer FIG. 12 and FIG. 13, wherein FIG. 12 is a diagram showing an embodiment of process module that performs a third-level calculation in the fast walsh block demodulation device provided by the present invention, and FIG. 13 is a diagram showing an embodiment of coordinate location while the process module shown in FIG. 12 is implemented. When the coordinate position of fixed complex signal is located near the x-axis or the y-axis, it is known that a maximum value, which is the addition result of the fixed complex signal B and the rotated unfixed complex signal A, is located near the x-axis or the y-axis, correspondingly, according to the above mathematical theorem. Hence, by utilizing a dotted line 770 located on +45° and −135° and a dotted line 772 located on 45° and +135°, a plane is divided into four regions: M, N, O and P as shown in FIG. 13, wherein region M is X+Y>0 and X−Y≧0;
region N is X+Y≧0 and X−Y<0;
region O is X+Y<0 and X−Y≦0; and
region P is X+Y≦0 and X−Y>0.

Then M, N, O and P regions are assigned to the numbers: 0, 1, 2 and 3, respectively. After the unfixed complex signal a is sent into the process module 708 and is decided by a decision module 750, if the unfixed complex signal a is located on the M region, region code p1 is set to be 0, and if the unfixed complex signal a is located on the N region, region code p1 is set to be 1, and if the unfixed complex signal a is located on the O region, region code p1 is set to be 2, and if the unfixed complex signal a is located on the P region, region code p1 is set to be 3. Similarly, if the fixed complex signal b is located on the M region, region code p2 is set to be 0, and if the fixed complex signal b is located on the N region, region code p2 is set to be 1, and if the unfixed complex signal b is located on the O region, region code p2 is set to be 2, and if the unfixed complex signal b is located on the P region, region code p2 is set to be 3.

Since there is a maximum value that is the addition result of the fixed complex signal and the unfixed complex signal, which is located on a region on which the fixed complex signal B located when the unfixed complex signal has been rotated 0 degree, or 90 degrees, or 180 degrees, or 270 degrees. Therefore, a formula (2) is obtained, $$\text{Mod4}(p1+K)=p2 \quad (2)$$

wherein mod4 is a remainder after dividing by 4, and K is a rotation angle code indicating an angle, which the unfixed complex signal is rotated. For example, if K=0, the unfixed complex signal is rotated 0 degree; if K=1, the unfixed complex signal is rotated 90 degrees; if K=2, the unfixed complex signal is rotated 180 degrees; and if K=3, the unfixed complex signal is rotated 270 degrees. In other way, the formula (2) can be written to be the formula (3).

$$K=\text{mod4}(p2-p1) \quad (3)$$

Hence, in a rotational angle calculation module 752, K is obtained by utilizing the formula (3) with region code p1 and region code p2, and then the rotational angle 754, which the unfixed complex signal a is rotated, is obtained according to K. Afterwards, the rotational angle 754 is sent to a rotation process module 756 for rotating the unfixed complex signal a, and then a rotated unfixed complex signal a' is outputted and adds to the fixed complex signal b in an operator 758, so that a maximum value Q is obtained and is regarded as an output 698 of the process module 708.

Figure 14:
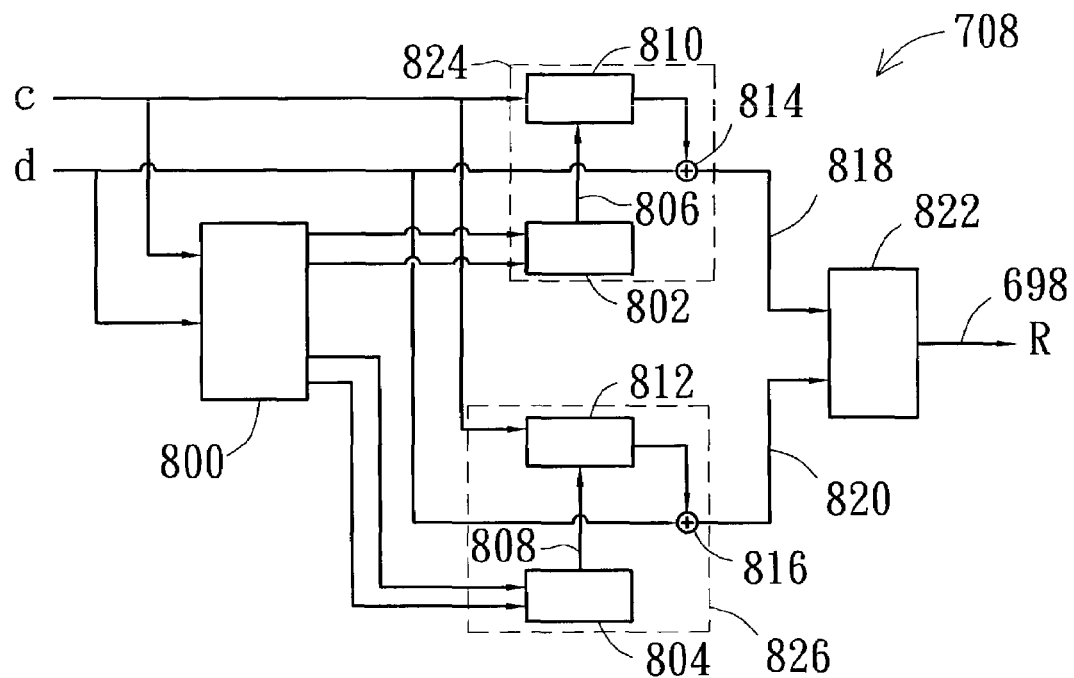
FIG. 14 is a diagram showing another embodiment of process module that performs a third-level calculation in the fast walsh block demodulation device provided by the present invention.

Referring to FIG. 14, FIG. 14 is a diagram showing another embodiment of process module that performs a third-level calculation in the fast walsh block demodulation device provided by the present invention. The fast walsh block demodulation device shown in FIG. 14 is provided by the present invention to deal with more complicated complex signal. For example, in situation I, first, a decision module 800 decides the location of unfixed complex signal c that inputs to the process module 708. If the unfixed complex signal c is located near x-axis or y-axis, region code p1a and region code p1b are set to be equal to region code p1 (for example, according to the separation shown in FIG. 13, if the unfixed complex signal c is located in region N, p1a=p1b=p1=1).

Figure 15:
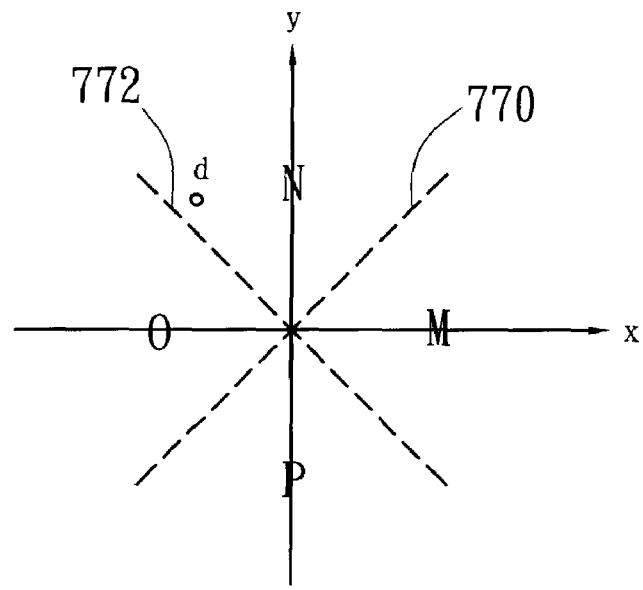
FIG. 15 is a diagram showing the coordinate location of complex signal d while the fast walsh block demodulation device provided by the present invention is implemented.

Then the decision module 800 decides the location of fixed complex signal d that inputs to the process module 708. If the fixed complex signal d is not located near x-axis or y-axis and is located near ±45° or ±135°, region code p2a is set not to be equal to region p2b. Please referring to FIG. 15, FIG. 15 is a diagram showing the coordinate location of complex signal d while the fast walsh block demodulation device provided by the present invention is implemented. As shown in FIG. 15, if the fixed complex signal d is located near +135°, the decision module 800 assumes that the position of the fixed complex signal d is located on the region N and the region O meanwhile, and region code p2a is set to be 1 and region code p2b is set to be 2 (or region code p2a is set to be 2 and region code p2b is set to be 1).

Then p1a and p2a are sent to a first rotational angle calculation module 802, and p1b and p2b are sent to a second rotational angle calculation module 804. A first rotational angle 806 is calculated and obtained by the first rotational angle calculation module 802 according to $K_a$=mod4(p2a−p1a) (formula (3)), and a second rotational angle 508 is calculated and obtained by the second rotational angle calculation module 804 according to $K_b$=mod4(p2b−p1b) (formula (3)). After the first rotational angle 806 and the second rotational angle 808 sent to a first rotation process module 810 and a second rotation process module 812 respectively, the first rotation process module 810 rotates the unfixed complex signal c to obtain a rotated unfixed complex signal c1' according to the first rotational angle 806, and the second rotation process module 812 rotates the unfixed complex signal c to obtain a rotated unfixed complex signal c2' according to the second rotational angle 808.

Afterwards, the rotated unfixed complex signal c1' and the rotated unfixed complex signal c2' are sent to a first adder (first operator) 814 and a second adder (second operator) 816 respectively, and the fixed complex signal d adds the rotated unfixed complex signal c1' and the rotated unfixed complex signal c2' respectively, so that a first addition result 818 and a second addition result 820 are obtained. Then, the first addition result 818 and the second addition result 820 are sent to a comparator 822 to compare for obtaining a maximum value R. This maximum value R is regarded as a correlation calculation output 698 of process module 708.

In situation II, if the unfixed complex signal c and the fixed complex signal d are located near x-axis or y-axis, region code p2a and region code p2b are set to be equal to region code p2 (for example, according to the separation shown in FIG. 13, if the fixed complex signal d is located in region N, p2a=p2b=p2=1), and region code p1a and region code p1b are set to be equal to region code p1 (for example, according to the separation shown in FIG. 13, if the fixed complex signal c is located in region N, p1a=p1b=p1=1).

Since p1a=p1b=p1 and p2a=p2b=p2, thereby either a first calculation circuit 824 or a second calculation circuit 826 is executed, wherein the first calculation circuit 824 is constructed by the first rotational angle calculation module 802, the first rotation process module 810 and the first adder 814, and the second calculation circuit 826 is constructed by the second rotational angle calculation module 804, the second rotation process module 812 and the second adder 816.

For example, when p1a=p1b=p1 and p2a=p2b=p2, the first calculation circuit 824 is executed. The region code p1a and p2a are sent to the first rotational angle calculation module 802, and the first rotational angle 806 is calculated and obtained by the first rotational angle calculation module 802 according to $K_a$=mod4(p2a−p1b) (formula (3)). After the first rotational angle 806 is sent to the first rotation process module 810, the first rotation process module 810 rotates the unfixed complex signal c to obtain a rotated unfixed complex signal c1' according to the first rotational angle 806. Then, the rotated unfixed complex signal c1' is sent to the first adder 814, and an addition of the fixed complex signal d and the rotated unfixed complex signal c1' is performed for obtaining a first addition result 818. This first addition result 818 is the maximum value R, which is regarded as a correlation calculation output 698 of process module 708.

Figure 16:
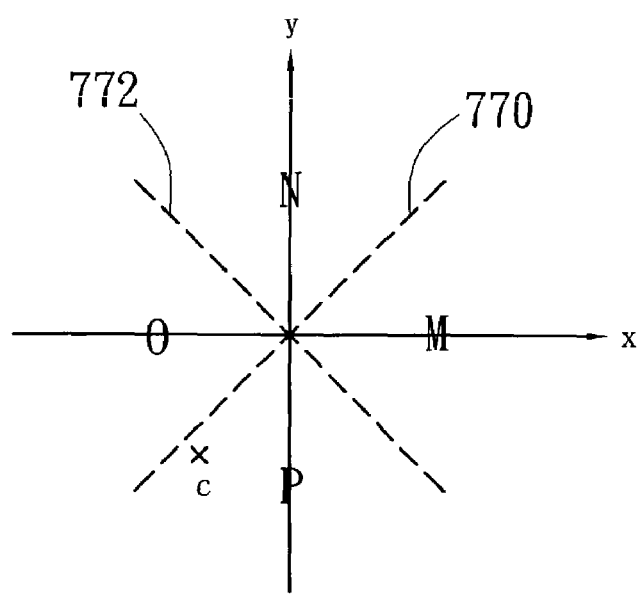
FIG. 16 is a diagram showing the coordinate location of complex signal c while the fast walsh block demodulation device provided by the present invention is implemented.

In situation III, if the unfixed complex signal c is not located near x-axis or y-axis and is located near ±45° or ±135°, region code p1a is set not to be equal to region p1b. Please referring to FIG. 16, FIG. 16 is a diagram showing the coordinate location of complex signal c while the fast walsh block demodulation device provided by the present invention is implemented. As shown in FIG. 16, if the unfixed complex signal c is located near −135°, the decision module 800 assumes that the position of the unfixed complex signal c is located on the region P and the region O meanwhile, and region code p1a is set to be 2 and region code p1b is set to be 3 (or region code p1a is set to be 3 and region code p1b is set to be 2). At this time, wherever the fixed complex signal d is located on, such as near x-axis, y-axis, ±45° or ±135°, the region code p2a can be set to equal to p2b and p2, according to the region on which the fixed complex signal is located.

Then p1a and p2a are sent to a first rotational angle calculation module 802, and p1b and p2b are sent to a second rotational angle calculation module 804. A first rotational angle 806 is calculated and is obtained by the first rotational angle calculation module 802 according to $K_a$=mod4(p2a−p1a) (formula (3)), and a second rotational angle 808 is calculated and is obtained by the second rotational angle calculation module 804 according to $K_b$=mod4(p2b−p1b) (formula (3)). After the first rotational angle 806 and the second rotational angle 808 are sent to a first rotation process module 810 and a second rotation process module 812 respectively, the first rotation process module 810 rotates the unfixed complex signal c to obtain a rotated unfixed complex signal c1' according to the first rotational angle 806, and the second rotation process module 812 rotates the unfixed complex signal c to obtain a rotated unfixed complex signal c2' according to the second rotational angle 808.

Afterwards, the rotated unfixed complex signal c1' and the rotated unfixed complex signal c2' are sent to a first adder (first operator) 814 and a second adder (second operator) 816 respectively, and the fixed complex signal d is added to the rotated unfixed complex signal c1' and the rotated unfixed complex signal c2' respectively, so that a first addition result 818 and a second addition result 820 are obtained. Then, the first addition result 818 and the second addition result 820 are sent to a comparator 822 for comparison to obtaining a maximum value R. This maximum value R is regarded as a correlation calculation output 698 of process module 708.

Hence, by utilizing the process module 708 shown in FIG. 14 as the third-level operator of fast walsh block demodulation device, eight to twelve adders can be reduced in the twenty-eight adders of traditional basic fast walsh block demodulation device, so that the hardware miniaturization is achieved, and meanwhile sixteen outputs of traditional fast walsh block demodulation device are reduced to four outputs, thereby other surplus calculations of traditional basic fast walsh block demodulation device are omitted, and the quantities of comparators are decreased. Therefore, regardless of calculation time and hardware implementation, there are substantial improvements.

In addition, the dotted line 770 and the dotted line 772 utilized to divide a plane into four regions as shown in FIG. 13 are not limited to the ±45° locations and the ±135° locations and are dependent on the circuit design and the complex signal processed. For example, two bisectors located on ±90° and ±180° can be utilized, or another two bisectors, which can divide a plane to four even regions and can be located on any degrees, can be utilized.

In order to further enhance the demodulating speed of demodulation system 550 shown in FIG. 9 and to further reduce power consumption and geometric structure, the demodulation system 550 shown in FIG. 9 and the fast walsh block demodulation device 700 shown in FIG. 10 can be implemented in combination after appropriate modification and integration so as to obtain better efficiency during demodulation calculations.

If an additional Φ2 assigned circuit is utilized in the demodulation system 550, and the first fast walsh block demodulation device 552, the second fast walsh block demodulation device 554, the third fast walsh block demodulation device 556 and the fourth fast walsh block demodulation device 558 all utilize the process module shown in FIG. 12 as the process module, it takes thirty-two adders (operators) to construct the demodulation system 550, and the operation quantity of demodulation system 550 is forty.

Additional, if an additional Φ2 assigned circuit is utilized in the demodulation system 550, and the first fast walsh block demodulation device 552, the second fast walsh block demodulation device 554, the third fast walsh block demodulation device 556 and the fourth fast walsh block demodulation device 558 all utilize the process module shown in FIG. 14 as the process module, it takes forty adders (operators) to construct the demodulation system 550, and the operation quantity of demodulation system 550 is fifty. Therefore, comparing to the demodulation system 550 shown in FIG. 9, the quantity of operators and the operation are further reduced. (the demodulation system 550 shown in FIG. 9 is constructed by one hundred and twenty-eight adders, and the operation quantity thereof is eighty.) Moreover, the bi-stage correlation calculation demodulation system provided by the present invention is not limited to the embodiments shown in FIG. 4, FIG. 7 and FIG. 9, and can be modified according to various software, hardware and firmware at demodulation terminal.

For example, in the first-stage calculation apparatus 352, a first CCK codeword can be selected from g1 310, g2 312, g3 314, g4 316, g5 318, g6 320, g7 322 and g8 324, respectively, for performing a plurality of correlation calculations. It means that eight CCK codewords, whose assigned number are {1,6,18,21,2,5,17,22} respectively, are distributed to the first-stage calculation apparatus 352 for performing the first-stage correlation calculations, and other fifty-six CCK codewords are distributed to the second-stage calculation apparatus group 354 for performing the second-stage correlation calculations.

In another example, a first CCK codeword and a second CCK codeword can be selected from g1 310, g2 312, g3 314, g4 316, g5 318, g6 320, g7 322 and g8 324, respectively, in the first-stage calculation apparatus 352 for performing a plurality of correlation calculations. It means that sixteen CCK codewords in eight groups, whose assigned number are {(1,3), (6,8), (18,20), (21,23), (2,4), (5,7), (17,19), (22,24)} respectively, are distributed to the first-stage calculation apparatus 352 for performing the first-stage correlation calculations, and other forty-eight CCK codewords are distributed to the second-stage calculation apparatus group 354 for performing the second-stage correlation calculations.

Otherwise, in the first-stage calculation apparatus 352, a first CCK codeword, a second CCK codeword and a third CCK codeword can be selected from g1 310, g2 312, g3 314, g4 316, g5 318, g6 320, g7 322 and g8 324, respectively, for performing a plurality of correlation calculations. It means that twenty-four CCK codewords in eight groups, whose assigned number are {(1,3,9), (6,8,14), (18,20,26), (21,23,29), (2,4,10), (5,7,13), (17,19,25), (22,24,30)} respectively, are distributed to the first-stage calculation apparatus 352 for performing the first-stage correlation calculations, and other forty CCK codewords are distributed to the second-stage calculation apparatus group 354 for performing the second-stage correlation calculations.

Figure 17:
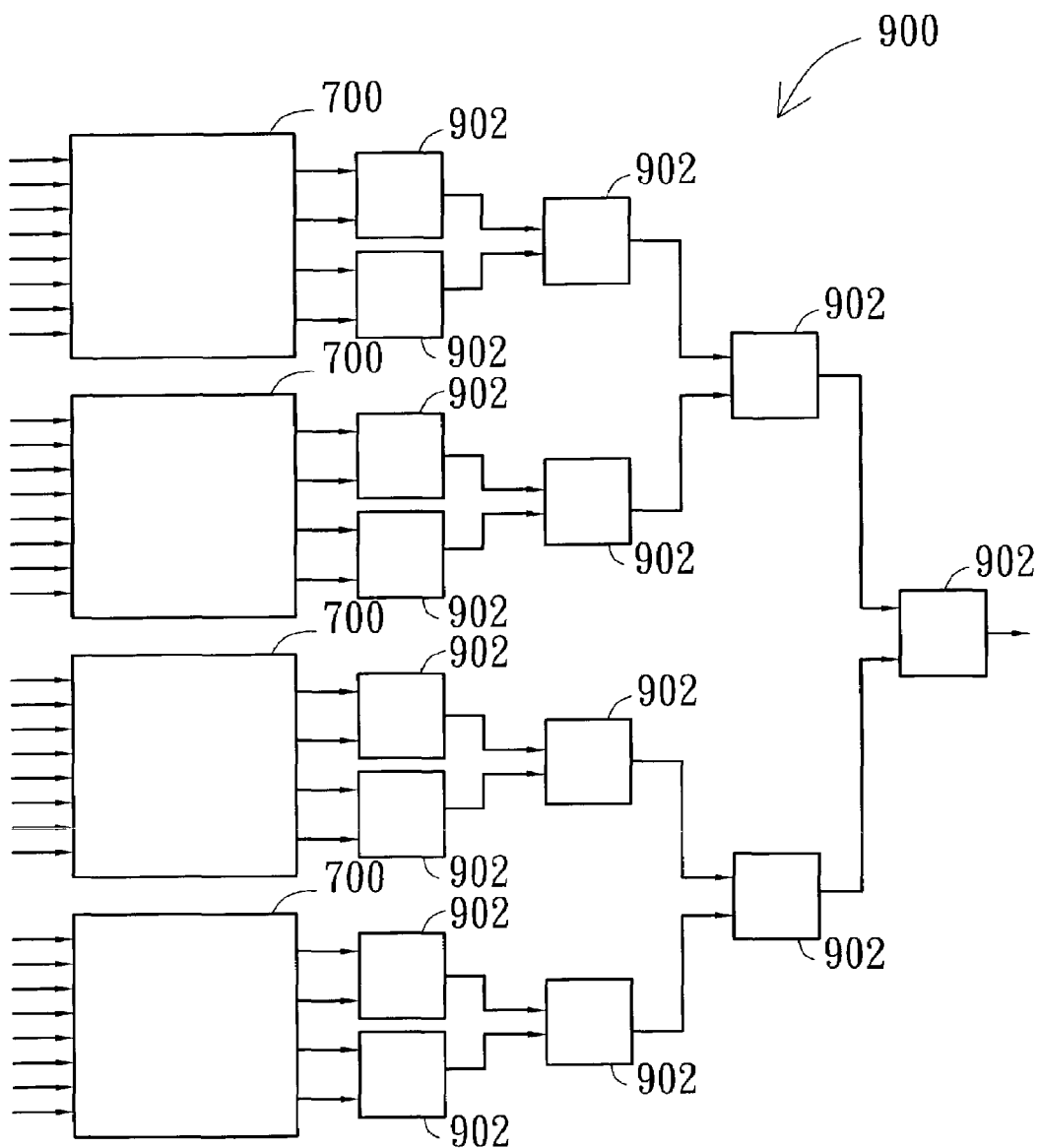
FIG. 17 is a diagram showing an embodiment of CCK demodulation system constructed by the fast walsh block demodulation devices provided by the present invention.

FIG. 17 is a diagram showing an embodiment of CCK demodulation system constructed by the fast walsh block demodulation devices provided by the present invention. In the CCK demodulation system 900 shown in FIG. 17, the demodulation calculations of sixty-four CCK codewords are processed simultaneously, and there are four outputs from each fast walsh block demodulation device 700 of the present invention. As shown in FIG. 17, comparators 902 are utilized to compare each two outputs from each fast walsh block demodulation device 700, and finally a maximum value among the outputs from four fast walsh block demodulation devices is obtained.

As shown in FIG. 17, there is known that the CCK demodulation system 900 constructed by the fast walsh block demodulation devices 700 of the present invention just needs four comparator-levels constructed by fifteen comparators 902. However, for obtaining the maximum value among a lot of outputs, the CCK demodulation system constructed by the traditional basic fast walsh block demodulation devices needs six comparator-levels constructed by sixty-three comparators. Moreover, since the third-level adders of traditional basic fast walsh block are replaced by the process modules shown in FIG. 12 or FIG. 14 according to the present invention, signal delay is decreased, and the hardware is minimized substantially by utilizing the present invention, so cost is decreased.

Figure 18:
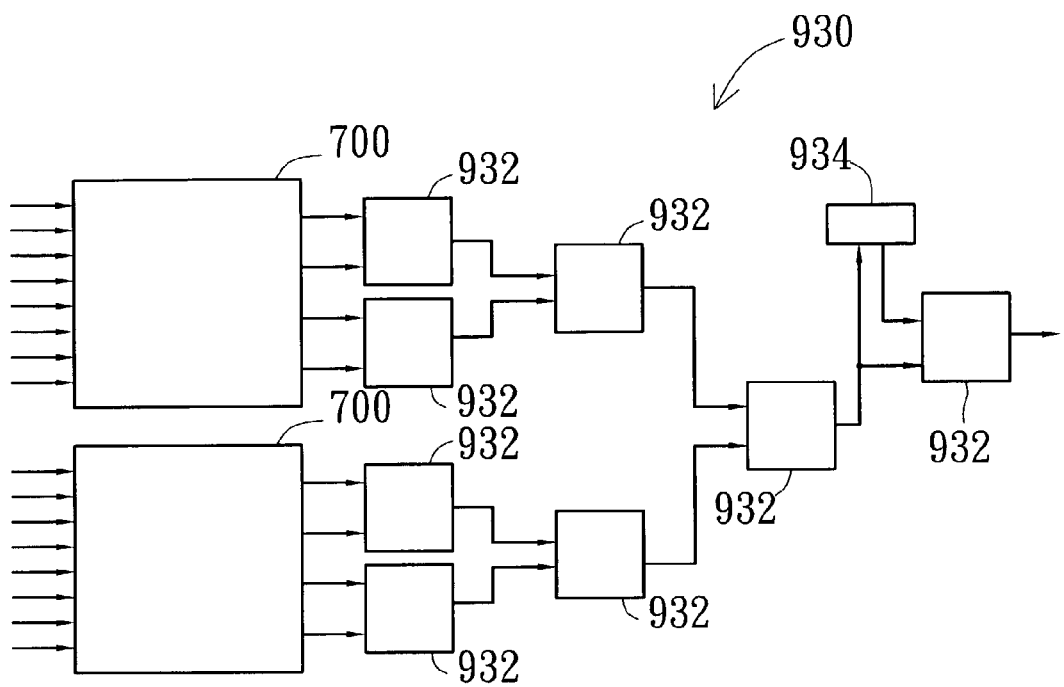
FIG. 18 is a diagram showing another embodiment of CCK demodulation system constructed by the fast walsh block demodulation devices provided by the present invention.

FIG. 18 is a diagram showing another embodiment of CCK demodulation system constructed by the fast walsh block demodulation devices provided by the present invention. In the CCK demodulation system 930 shown in FIG. 18, the demodulation calculations of thirty-two CCK codewords in sixty-four CCK codewords are processed first, and then the comparators 932 compare the outputs from each fast walsh block demodulation device 700, and a first temporary value is obtained and saved in a register 934. Afterwards, the demodulation calculations of another thirty-two CCK codewords in sixty-four CCK codewords are processed, and then the comparators 932 compare the outputs from each fast walsh block demodulation device 700, and a second temporary value is obtained. Finally, a comparing process is processed with the second temporary value and the first temporary value for obtaining a maximum value of correlation calculations.

Figure 19:
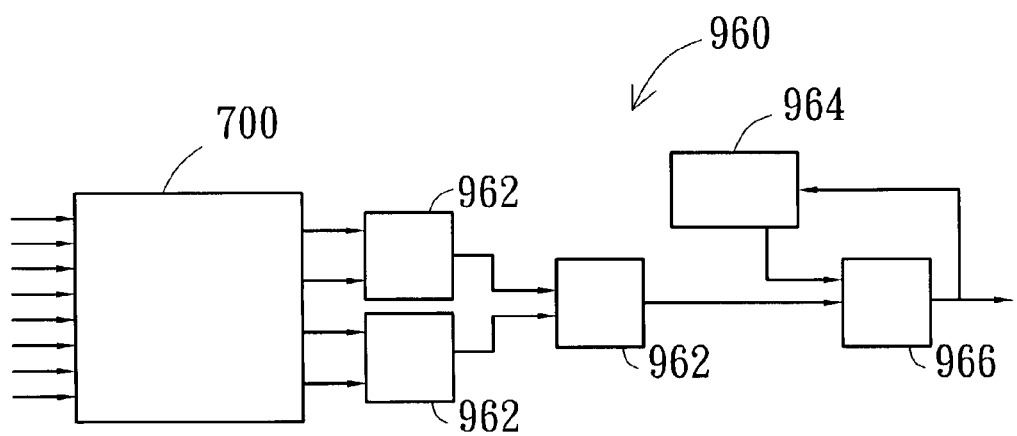
FIG. 19 is a diagram showing another embodiment of CCK demodulation system constructed by the fast walsh block demodulation devices provided by the present invention.

FIG. 19 is a diagram showing another embodiment of CCK demodulation system constructed by the fast walsh block demodulation devices provided by the present invention. In the CCK demodulation system 960 shown in FIG. 19, a complete demodulation consists of four demodulation steps for accomplishing demodulations of sixty-four CCK codewords, wherein one demodulation step consists of the demodulations of sixteen CCK codewords.

In the first demodulation step, comparator 962 compares the outputs from the fast walsh block demodulation device 700 and picks the greatest output as a first temporary value that is saved in a register 964. In the second demodulation step, comparator 962 compares the outputs from the fast walsh block demodulation device 700 and picks the greatest output as a second temporary value, and then the second temporary value is compared with the first temporary value saved in the register 964 previously by a comparator 966, and the comparator 966 picks the greatest one as a first output of comparator 966, and the first output of comparator 966 is saved in the register 964. In the third demodulation step, comparator 962 compares the outputs from the fast walsh block demodulation device 700 and picks the greatest output as a third temporary value, and then the third temporary value is compared with the first output of comparator 966 saved in the register 964 previously by the comparator 966. The comparator 966 picks the greatest one as a second output of comparator 966, and the second output of comparator 966 is saved in the register 964. Finally, in the fourth demodulation step, comparator 962 compares the outputs from the fast walsh block demodulation device 700 and picks the greatest one as a fourth temporary value, and then the fourth temporary value is compared with the second output of comparator 966 saved in the register 964 previously by the comparator 966. Finally, the comparator 966 picks the greatest one as the output of CCK demodulation system 960 shown in FIG. 19.

Comparing with FIG. 17, FIG. 18 and FIG. 19, the CCK demodulation system 900 shown in FIG. 17 has the fastest demodulating speed among the three CCK demodulation system shown in FIG. 17, FIG. 18 and FIG. 19, and the demodulating speed of the CCK demodulation system 960 shown in FIG. 19 is the slowest among the three CCK demodulation system shown in FIG. 17, FIG. 18 and FIG. 19, but the hardware structure of the CCK demodulation system 960 shown in FIG. 19 is the smallest among the three CCK demodulation system shown in FIG. 17, FIG. 18 and FIG. 19. The demodulating speed and the hardware structure of the CCK demodulation system 930 shown in FIG. 18 are the medium among those of the three CCK demodulation systems shown in FIG. 17, FIG. 18 and FIG. 19. Therefore, designers can utilize appropriate CCK demodulation system in accordance with product appearance, function, cost, and etc., so that there are many advantages, such as speeding up the demodulating speed, decreasing cost and flexible design, by utilizing the present invention.

The primary advantage of the present invention is to provide a CCK demodulation system, and more particularly relates to a bi-stage correlation calculation demodulation system. By utilizing the incomplete orthogonal property of CCK codewords, the CCK codewords can be distributed properly for performing the first-stage correlation calculations and the second-stage correlation calculations in sequence. Thus, the power consumption of CCK demodulation system is decreased, and the demodulating speed is raised, so that the CCK codeword transmitted from transmitter is resolved rapidly, correctly and efficiently. Moreover, the CCK demodulation system and the fast walsh block demodulation device of the present invention can be implemented together coordinately. Therefore, the geometric volume of demodulation system and the power consumption are further decreased, and the demodulating speed is further enhanced.

Another advantage of the present invention is to provide a fast walsh block demodulation device, and more particularly relates to a fast walsh block demodulation device, whose third-level calculations are performed by process modules, which have functions of picking one maximum value from four values and third-level correlation calculation of traditional basic fast walsh block demodulation device. By replacing the third-level operators in the traditional basic fast walsh block demodulation device by the process modules, the operation quantities of traditional basic fast walsh block demodulation device are reduced, and by utilizing the function of picking one maximum value from four values, the sixteen outputs of traditional basic fast walsh block demodulation device are reduced to four outputs, so that the quantities of operators and the quantities of comparators can be reduced substantially. Thus, the geometric volume of demodulation system and the power consumption are decreased, and the demodulating speed is speeded up.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A complementary code keying (CCK) demodulation system utilized in demodulation equipment of WLAN, the CCK demodulation system comprising:

a first-stage calculation apparatus used to perform a plurality of first-stage calculations with an input signal, and to output a plurality of first-stage calculation results, wherein the input signal has a communicative CCK codeword, and thirty-two CCK codewords of sixty-four CCK codewords are utilized in the plurality of first-stage calculations, and the plurality of first-stage calculation results are divided to eight groups, and each of the eight groups consists of at least one first-stage calculation result of the plurality of first-stage calculation results;

a first decision module used to decide and compare the plurality of first-stage calculation results, and if a first-stage calculation result in a group of the eight groups is a maximum value of the plurality of first-stage calculation results and is greater than a maximum threshold, and meanwhile at least one other first-stage calculation result in the group is less than a minimum threshold, the communicative CCK codeword of the input signal is resolved by the first decision module in accordance with the maximum value, and if the maximum value of the plurality of first-stage calculation results is less than the maximum threshold and at least one of the plurality of first-stage calculation results is less than the minimum threshold, the first decision module outputs at least one activated signal;

a second-stage calculation apparatus group used to receive the at least one activated signal and consists of a plurality of second-stage calculation apparatuses that constitute a first sub-apparatus group and a second sub-apparatus group, and according to the at least one activated signal, the first sub-apparatus group or the second sub-apparatus group is activated to perform at least one second-stage calculation with the input signal, and at least one second-stage calculation result is outputted, wherein another thirty-two CCK codewords of sixty-four CCK codewords are utilized in the at least one second-stage calculation; and a second decision module used to resolve the communicative CCK codeword of the input signal according to the least one second-stage calculation.

2. The complementary code keying demodulation system of claim 1, wherein the complementary code keying demodulation system further comprise a Φ2 assigned circuit so as to enable the first-stage calculation apparatus and the second-stage calculation apparatus group to utilize a circuit structure commonly.

3. A CCK demodulation system utilized in demodulation equipment of WLAN, the CCK demodulation system comprising:
a first-stage calculation apparatus comprising a first fast walsh block demodulation device and a second fast walsh block demodulation device, wherein the first-stage calculation apparatus is used to perform a plurality of first-stage calculations with an input signal, and to output a plurality of first-stage calculation results of the first fast walsh block demodulation device and a plurality of first-stage calculation results of the second fast walsh block demodulation device, and the input signal has a communicative CCK codeword, and thirty-two CCK codewords of sixty-four CCK codewords are utilized in the plurality of first-stage calculations;
a first decision module used to perform a judgment and comparison step according to the plurality of first-stage calculation results of the first fast walsh block demodulation device and the plurality of first-stage calculation results of the second fast walsh block demodulation device, wherein the judgment and comparison step comprise:
when a maximum value of the plurality of first-stage calculation results of the first fast walsh block demodulation device is greater than a maximum threshold, and a maximum value of the plurality of first-stage calculation results of the second fast walsh block demodulation device is between the maximum threshold and a minimum threshold, regarding a CCK codeword, to which the maximum value of the plurality of first-stage calculation results of the first fast walsh block demodulation device corresponds, as the communicative CCK codeword and using the communicative CCK codeword as an output of the CCK demodulation system;
when the maximum value of the plurality of first-stage calculation results of the second fast walsh block demodulation device is greater than the maximum threshold, and the maximum value of the plurality of first-stage calculation results of the first fast walsh block demodulation device is between the maximum threshold and the minimum threshold, regarding the CCK codeword, to which the maximum value of the plurality of first-stage calculation results of the second fast walsh block demodulation device corresponds, as the communicative CCK codeword and using the communicative CCK codeword as the output of the CCK demodulation system;
if the maximum value of the plurality of first-stage calculation results of the first fast walsh block demodulation device and the maximum value of the plurality of first-stage calculation results of the second fast walsh block demodulation device are less than the maximum threshold, and meanwhile the maximum value of the plurality of first-stage calculation results of the first fast walsh block demodulation device is less than the minimum threshold, outputting a first activated signal; and
if the maximum value of the plurality of first-stage calculation results of the first fast walsh block demodulation device and the maximum value of the plurality of first-stage calculation results of the second fast walsh block demodulation device are less than the maximum threshold, and meanwhile the maximum value of the plurality of first-stage calculation results of the second fast walsh block demodulation device is less than the minimum threshold, outputting a second activated signal;
a second-stage calculation apparatus comprising a third fast walsh block demodulation device and a fourth fast walsh block demodulation device, wherein the second-stage calculation apparatus group is used to receive the first activated signal to activate the third fast walsh block demodulation device or to receive the second activated signal to activate the fourth fast walsh block demodulation device for performing at least one second-stage calculation with the input signal and outputting at least one second-stage calculation result, and other thirty-two CCK codewords of sixty-four CCK codewords are utilized in the at least one second-stage calculations; and
a second decision module used to resolve the communicative CCK codeword regarded as the output of the CCK demodulation system according to the least one second-stage calculation result.

4. The CCK demodulation system of claim 3, wherein further comprise a $\Phi 2$ assigned circuit so as to enable the first-stage calculation apparatus and the second-stage calculation apparatus to utilize a circuit structure commonly.

5. A CCK demodulation system utilized in demodulation equipment of WLAN, the CCK demodulation system comprising:
a first-stage calculation apparatus comprising a first fast walsh block demodulation device and a second fast walsh block demodulation device, wherein the first-stage calculation apparatus is used to perform a plurality of first-stage calculations with an input signal, and to output a plurality of first-stage calculation results of the first fast walsh block demodulation device and a plurality of first-stage calculation results of the second fast walsh block demodulation device, and the input signal has a communicative CCK codeword, and thirty-two CCK codewords of sixty-four CCK codewords are utilized in the plurality of first-stage calculations, and the first fast walsh block demodulation device is constructed by a plurality of first operators and a plurality of first process modules, and the second fast walsh block demodulation device is constructed by a plurality of second operators and a plurality of second process modules;
a first decision module used to perform a judgment and comparison step according to the plurality of first-stage calculation results of the first fast walsh block demodulation device and the plurality of first-stage calculation results of the second fast walsh block demodulation device, wherein the judgment and comparison step comprise:
when a maximum value of the plurality of first-stage calculation results of the first fast walsh block demodulation device is greater than a maximum threshold, and a maximum value of the plurality of first-stage calculation results of the second fast walsh block demodulation device is between the maximum threshold and a minimum threshold, regarding a CCK codeword, to which the maximum value of the plurality of first-stage calculation results of the first fast walsh block demodulation device corresponds, as the communicative CCK codeword and using the communicative CCK codeword as an output of the CCK demodulation system;

when the maximum value of the plurality of first-stage calculation results of the second fast walsh block demodulation device is greater than the maximum threshold, and the maximum value of the plurality of first-stage calculation results of the first fast walsh block demodulation device is between the maximum threshold and the minimum threshold, regarding the CCK codeword, to which the maximum value of the plurality of first-stage calculation results of the second fast walsh block demodulation device corresponds, as the communicative CCK codeword and using the communicative CCK codeword as the output of the CCK demodulation system;

if the maximum value of the plurality of first-stage calculation results of the first fast walsh block demodulation device and the maximum value of the plurality of first-stage calculation results of the second fast walsh block demodulation device are less than the maximum threshold, and meanwhile the maximum value of the plurality of first-stage calculation results of the first fast walsh block demodulation device is less than the minimum threshold, outputting a first activated signal; and if the maximum value of the plurality of first-stage calculation results of the first fast walsh block demodulation device and the maximum value of the plurality of first-stage calculation results of the second fast walsh block demodulation device are less than the maximum threshold, and meanwhile the maximum value of the plurality of first-stage calculation results of the second fast walsh block demodulation device is less than the minimum threshold, outputting a second activated signal;

a second-stage calculation apparatus comprising a third fast walsh block demodulation device and a fourth fast walsh block demodulation device, wherein the second-stage calculation apparatus group is used to receive the first activated signal to activate the third fast walsh block demodulation device or to receive the second activated signal to activate the fourth fast walsh block demodulation device for performing at least one second-stage calculation with the input signal and outputting at least one second-stage calculation result, and other thirty-two CCK codewords of sixty-four CCK codewords are utilized in the at least one second-stage calculations, and the third fast walsh block demodulation device is constructed by a plurality of third operators and a plurality of third process modules, and the fourth fast walsh block demodulation device is constructed by a plurality of fourth operators and a plurality of fourth process modules; and a second decision module used to resolve the communicative CCK codeword regarded as the output of the CCK demodulation system according to the least one second-stage calculation result.

6. The CCK demodulation system of claim 5, wherein further comprise a Φ2 assigned circuit so as to enable the first-stage calculation apparatus and the second-stage calculation apparatus to utilize a circuit structure commonly.

7. The CCK demodulation system of claim 5, wherein the plurality of first process modules, the plurality of second process modules, the plurality of third process modules and the plurality of fourth process modules have the functions of picking one maximum value from four values and a correlation calculation.

8. A fast walsh block demodulation structure utilized in a demodulation structure, the fast walsh block demodulation structure comprising:

a plurality of operators used to perform a plurality of first-level calculations and a plurality of second-level calculations with an inputted signal, and to output a plurality of second-level calculation signals, wherein the plurality of second-level calculation signals comprises a plurality of fixed second-level calculation signals and a plurality of unfixed second-level calculation signals; and a plurality of process modules, wherein each of the plurality of process modules used to receive two of the plurality of second-level calculation signals comprising a fixed second-level calculation signal of the plurality of fixed second-level calculation signals and a unfixed second-level calculation signal of the plurality of unfixed second-level calculation signals, and each of the plurality of process modules comprises:

a decision module used to decide a first region on which the unfixed second-level calculation signal located and a second region on which the fixed second-level calculation signal located, and to output a first first region code(p1$a$), a first second region code (p1$b$), a second first region code (p2$a$) and a second second region code (p2$b$);

a first process circuit comprising:

a first rotating angle calculation module used to receive the first first region code (p1$a$) and the second first region code (p2$a$), and according to a formula: $K_a$=mod4(p2$a$−p1$a$) to resolve the $K_a$, wherein the $K_a$ is a first rotating angle code, and the mod4 is a remainder of dividing four, and then a first rotating angle corresponding to the first rotating angle code is obtained and outputted;

a first rotating process module used to receive the first rotating angle and the unfixed second-level calculation signal and to rotate the unfixed second-level calculation signal according to the first rotating angle for obtaining and outputting a first rotated second-level calculation signal; and a first calculator used to receive the first rotated second-level calculation signal and the fixed second-level calculation signal and to perform a first addition with the first rotated second-level calculation signal and the fixed second-level calculation signal for obtaining a first calculation result;

a second process circuit comprising:

a second rotating angle calculation module used to receive the first second region code (p1$b$) and the second second region code (p2$b$), and according to a formula: Kb=mod4(p2$b$−p1$b$) to resolve the Kb, wherein the Kb is a second rotating angle code, and then a second rotating angle corresponding to the second rotating angle code is obtained and outputted;

a second rotating process module used to receive the second rotating angle and the unfixed second-level calculation signal and to rotate the unfixed second-level calculation signal according to the first rotating angle for obtaining and outputting a second rotated second-level calculation signal; and a second calculator used to receive the second rotated second-level calculation signal and the fixed second-level calculation signal and to perform a second addition with the second rotated second-level calculation signal and the fixed second-level calculation signal for obtaining a second calculation result; and a comparator used to receive the first calculation result and the second calculation result, and to perform a comparison with the first calculation result and the second calculation result for obtaining the maximum value regarded as the process module output of each process module of the plurality of process modules.

* * * * *